(12) United States Patent
Pattabiraman et al.

(10) Patent No.: US 10,268,410 B2
(45) Date of Patent: Apr. 23, 2019

(54) EFFICIENT MODIFICATION OF STORAGE SYSTEM METADATA

(71) Applicant: NetApp, Inc., Sunnyvale, CA (US)

(72) Inventors: Jayalakshmi Pattabiraman, Sunnyvale, CA (US); Nikhil Mattankot, Sunnyvale, CA (US); Deekshith Belchapada, Sullia Tq (IN); Blake H. Lewis, Los Altos, CA (US); Subramaniam Periyagaram, Campbell, CA (US); Satya Suresh Chouta Naga Veera, Cupertino, CA (US); Rohit Singh, Cary, NC (US); Rajesh Khandelwal, Sunnyvale, CA (US); James Robert Morefield, Fuquay Varina, NC (US)

(73) Assignee: NETAPP, INC., Sunnyvale, CA (US)

( * ) Notice: Subject to any disclaimer, the term of this patent is extended or adjusted under 35 U.S.C. 154(b) by 134 days.

(21) Appl. No.: 14/518,088

(22) Filed: Oct. 20, 2014

(65) Prior Publication Data

US 2016/0110120 A1   Apr. 21, 2016

(51) Int. Cl.
    *G06F 3/06* (2006.01)
    *G06F 7/06* (2006.01)
    *G06F 12/02* (2006.01)

(52) U.S. Cl.
    CPC ............ *G06F 3/064* (2013.01); *G06F 3/0613* (2013.01); *G06F 3/0616* (2013.01); *G06F 3/0683* (2013.01); *G06F 7/06* (2013.01); *G06F 12/02* (2013.01)

(58) Field of Classification Search
    None
    See application file for complete search history.

(56) References Cited

U.S. PATENT DOCUMENTS

| | | | |
|---|---|---|---|
| 6,912,229 B1* | 6/2005 | Lauro | H04J 3/1647 370/465 |
| 8,849,767 B1 | 9/2014 | Zheng et al. | |
| 2004/0139284 A1 | 7/2004 | Clayton et al. | |
| 2005/0246382 A1 | 11/2005 | Edwards | |
| 2007/0156685 A1 | 7/2007 | Inoue et al. | |
| 2012/0102265 A1* | 4/2012 | Cong | G06F 11/1435 711/103 |

(Continued)

OTHER PUBLICATIONS

Python Sorting, Mar. 31, 2014, Google Developers.*

(Continued)

*Primary Examiner* — Sean D Rossiter
*Assistant Examiner* — Charles Choi
(74) *Attorney, Agent, or Firm* — Klein, O'Neill & Singh, LLP

(57) ABSTRACT

A first plurality of block identifiers is sorted based, at least in part, on a measure of spatial locality. A second plurality of block identifiers is sorted based, at least in part, on the measure of spatial locality. At least the first plurality of block identifiers and the second plurality of block identifiers are incrementally merged into a third plurality of block identifiers based, at least in part, on the measure of spatial locality. A block of data corresponding to metadata associated with a plurality of block identifiers of the third plurality of block identifiers is updated.

20 Claims, 10 Drawing Sheets

(56) References Cited

U.S. PATENT DOCUMENTS

| | | | |
|---|---|---|---|
| 2012/0131265 A1* | 5/2012 | Koltsidas | G06F 12/0868 |
| | | | 711/103 |
| 2013/0232295 A1 | 9/2013 | Benhase et al. | |
| 2014/0181126 A1* | 6/2014 | Nadj | G06F 7/22 |
| | | | 707/753 |
| 2015/0026429 A1 | 1/2015 | Bobroff et al. | |
| 2016/0062651 A1* | 3/2016 | Hineman | G06F 3/061 |
| | | | 711/114 |
| 2016/0098481 A1* | 4/2016 | Zhang | G06F 17/30705 |
| | | | 707/752 |
| 2016/0110121 A1 | 4/2016 | Singh et al. | |

OTHER PUBLICATIONS

Communications of the ACM, vol. 31, No. 3, Mar. 1988, pp. 348-352.
Non-Final Office Action on co-pending U.S. Appl. No. 14/518,157 dated Mar. 11, 2016.
Final Office Action on co-pending U.S. Appl. No. 14/518,157 dated Sep. 8, 2016.
Non-Final Office Action on co-pending U.S. Appl. No. 14/518,157 dated Apr. 21, 2017.
Final Office Action on co-pending U.S. Appl. No. 14/518,157 dated Nov. 15, 2017.
Notice of Allowance on co-pending U.S. Appl. No. 14/518,157 dated Mar. 29, 2018.

* cited by examiner

EFFICIENT MODIFICATION OF STORAGE SYSTEM METADATA

BACKGROUND

Aspects of the disclosures herein generally relate to the field of storage systems, and, more particularly, to efficiently updating storage system metadata.

Storage systems commonly maintain metadata to facilitate their operation. For example, storage systems can maintain metadata indicating which data blocks are available to be allocated, which data blocks belong to particular storage objects, etc. While some of the metadata remains relatively static, other metadata is subject to frequent modification. Modifications to the metadata can result in storage system overhead, thus decreasing the efficiency of the storage system itself. Decreased storage system efficiency can result in a poor user experience, higher costs, etc. Increasing the efficiency of the modifications to the metadata can decrease the storage system overhead, thus increasing the performance of the storage system.

BRIEF DESCRIPTION OF THE DRAWINGS

The disclosures herein may be better understood, and features made apparent to those skilled in the art by referencing the accompanying drawings.

DETAILED DESCRIPTION OF EXAMPLE ILLUSTRATIONS

Figure 1:
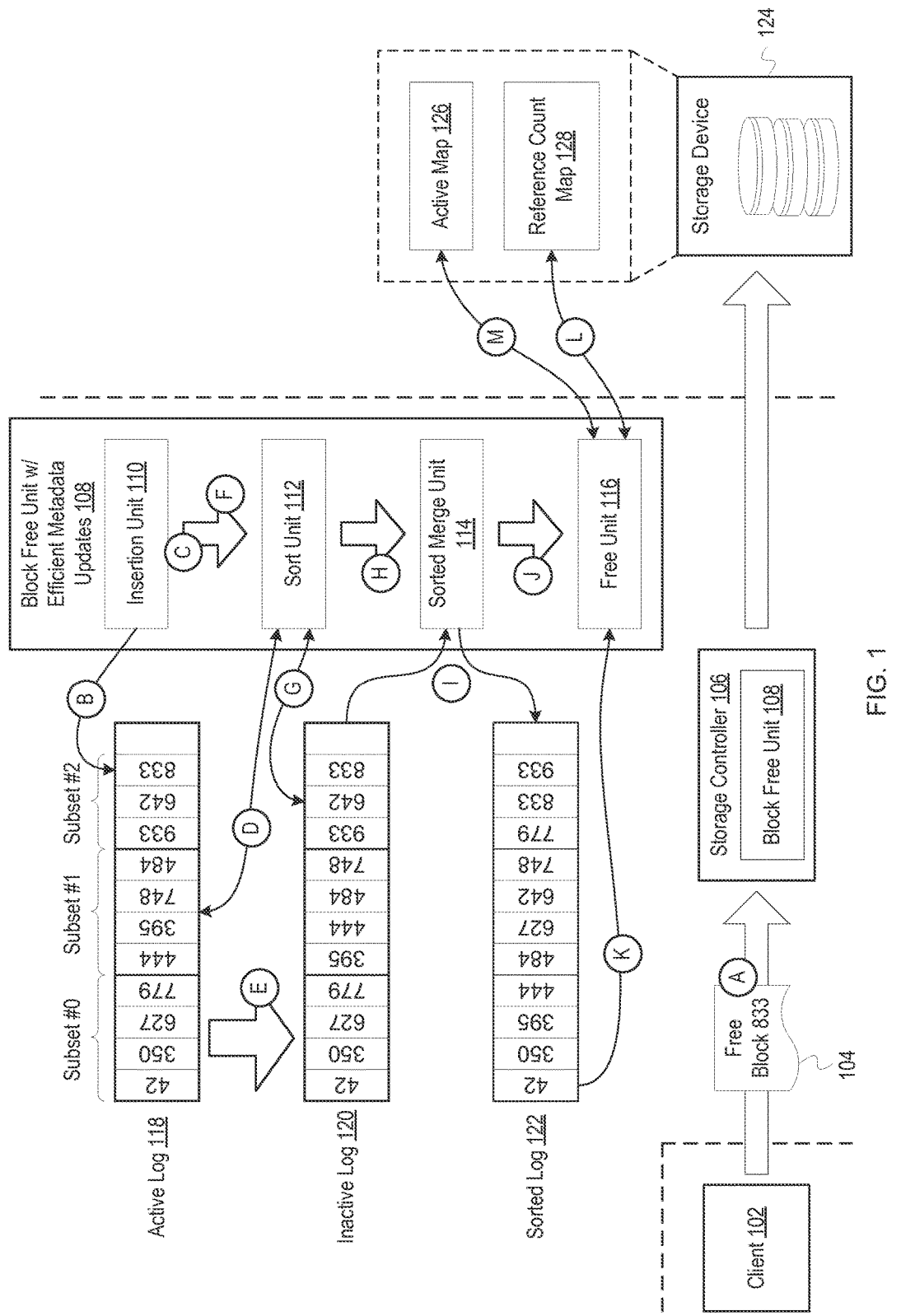
FIG. 1 is a conceptual diagram depicting a storage system including a block free unit with efficient metadata updates.

The description that follows includes example systems, methods, techniques, instruction sequences and computer program products that embody techniques of the disclosures herein. However, it is understood that the described examples may be practiced without these specific details. For instance, although examples refer to using an active map to track whether blocks are free or available to be allocated, other tracking structures can be utilized. In other instances, well-known instruction instances, protocols, structures and techniques have not been shown in detail in order not to obfuscate the description.

Storage devices, such as hard drives and solid state storage drives, are typically formatted into data blocks (hereinafter "blocks"). A block is, typically, the smallest unit of storage that can read or written to. In other words, if a block is four kilobytes in size, the entire four kilobytes of the block is read or written, even if only one byte of data is actually changed. Blocks that are representative of a block existing on a storage device are referred to herein as physical blocks.

File systems are typically formatted in a similar manner files within the file system are collections of blocks, which are referred to herein as logical blocks. In some instances, logical blocks and physical blocks have a one-to-one correspondence. In other words, if the physical blocks are four kilobytes in size, the logical blocks are four kilobytes in size, and the boundaries of the blocks correspond to physical blocks. In some instances, however, the logical blocks do not directly correspond to physical blocks. For example, logical blocks might be eight kilobytes while physical blocks are four kilobytes in size. In such a scenario, each logical block corresponds to two physical blocks.

Regardless of whether the subject is physical blocks or logical blocks, a mechanism is typically used to track whether a block is being used to store data ("allocated") or is available to be allocated ("free"). Consider, for example, the creation of a file. If the default size of the file is four kilobytes and the logical block size is four kilobytes, the file system allocates a single logical block to the file. The data associated with the file can then be written to the logical block. Later, when the file is deleted, instead of actually deleting the file data from the logical block, the file system changes a value to indicate that the logical block is free (i.e., unallocated). Thus, no data is actually deleted, but the logical block is still available to be allocated by the file system.

Various mechanisms, such as free lists and bitmaps, exist to track free blocks. A free list typically includes an indication, such as a block number, of blocks that are free. A bitmap, on the other hand, includes a set of bits wherein each bit is associated with a particular block. For example, the first bit of the bitmap might be associated with block one, the second bit of the bitmap might be associated with block two, and the nth bit of the bitmap might be associated with block n. Each bit can then be set to a particular value (0 or 1) to represent whether the block is free. The descriptions herein will assume the value 0 in a bitmap indicates a free block. The various data structures used to track free blocks, such as a bitmap or list, are referred to collectively as tracking structures. A bitmap tracking structure used to track which blocks are free is referred to as an "active map" (corresponding to a '1' signifying an allocated, or active, block).

As alluded to above, when certain operations are performed, blocks can be transitioned to a free state ("be freed"). In some instances, the operations performed to free a block can result in performance degradation. Consider a scenario in which an active map is used to track free blocks. The active map is a data structure that is represented in memory, on a storage device, etc. When a particular block is freed, the bit in the active map corresponding to that particular block is changed from a 1 to a 0 (corresponding to the transition between "used" and "free"). However, to change the individual bit, the entire block of data containing that bit is read and written to. If a large number of blocks are being freed, a block of data might be read and written to for each of the freed blocks. Thus, the updating of the active map can result in a large number of input/output operations.

The above problems are not limited to bitmaps, either, but rather most mechanisms that track free blocks. For example, to free a block using a free list, a block identifier is inserted or appended to the list. To then mark the block as in use, the corresponding block identifier is removed from the free list. Removing the block identifier from the free list is typically done by searching the free list for the particular identifier and deleting it. Thus, even though the updates occur when allocating blocks instead of freeing them, random updates to the free list may still occur at random locations within the free list, resulting in a large number of input/output operations.

While the tracking structures described above focus on tracking whether blocks are free or allocated, other tracking structures might exist. For example, in storage systems that support deduplication, multiple storage objects (such as files) might reference a single block. A block typically cannot be freed unless there are no additional references to that block. A tracking structure similar to a bitmap can be used to track the number of references to a single block. Instead of a block number corresponding to a single bit, a reference count tracking structure might map block numbers to groups of bits large enough to store the maximum number of references that can refer to a single block.

Further, tracking structures are just particular examples of metadata that may be updated during the operation of a storage system. In general, metadata that is changed subject to operations that might result in random updates to data can cause performance degradation as described above. Thus, the disclosures herein are applicable to other types of metadata as well. The illustrations herein will use the updating of block-related tracking structures as examples, but the disclosures can be adapted for other scenarios as well.

The performance penalty associated with random updates described above can be mitigated by not updating a tracking structure as soon as it is determined that the block is no longer needed. Instead, the blocks that are to be freed can be tracked in deferred-free block logs (hereinafter "block logs"). When an operation results in a freed block, a block identifier, such as the block number, is appended to an active deferred-free block log (hereinafter "active log"). As the active log fills up with block identifiers, subsets of the block identifiers are sorted with respect to other block identifiers in the respective subsets. Generally, the subsets of the block identifiers are contiguous entries in the active log. For example, the first ten block identifiers in the active log might be the first subset, the second ten block identifiers in the active log might be the second subset, etc.

Once the number of block identifiers in the active log (or size of the active log itself) reaches a particular threshold, a log switch occurs in which the active log becomes an inactive log and a previous, empty inactive log becomes the new empty active log. After the log switch, no more block identifiers are appended to the inactive log (previously the active log), but are appended to the new active log.

Once an active log becomes the inactive log, the various subsets of block identifiers (which are internally sorted) are merged with each other into a single sorted list of block identifiers. This single sorted list is stored in a sorted log and the inactive log is truncated or otherwise emptied. Once the sorted log is established, the sorted log is iterated through and the block identifiers to be freed are used to update the tracking structures. By sorting the block identifiers, the spatial locality of these updates to the tracking structures is increased, which can reduce the number of input/output operations performed to update the tracking structures.

FIG. 1 is a conceptual diagram depicting a storage system including a block free unit with efficient metadata updates. FIG. 1 depicts a storage system including a storage controller 106 and a storage device 124. The storage controller 106 includes a block free unit with efficient metadata updates (hereinafter "block free unit") 108 and the block free unit 108 includes an insertion unit 110, a sort unit 112, a sorted merge unit 114, and a free unit 116. FIG. 1 also includes a client 102.

The block free unit 108 (or the components thereof) operate on a set of block logs, including an active log 118, an inactive log 120, and a sorted log 122. In the examples described herein, the active log 118 becomes the inactive log 120 after a "log switch", while the sorted log 122 is independent of the active log 118 and inactive log 120, as described in more detail below. The block logs, or portions thereof, can be stored in memory (not depicted) located on the storage controller 106 or on one or more storage devices, such as the storage device 124. The active log 118 and inactive log 120 are divided into fixed size subsets of block identifiers. The subsets are identified by the brackets as well as bolded outlines.

At stage A, the client 102 issues a command 104 to storage controller 106. In this instance, the command 104 is a block-level command that specifically indicates that block '833' should be freed. The particular commands that can result in a block being freed can vary between protocols, storage system configurations, etc. For example, a command might indicate that data should be "deleted" instead of explicitly stating that a block should be freed. As another example, a command can be a file-level command instead of a block-level command. A file-level command might specify that a particular file should be deleted. The storage controller 106 can convert file-level commands to block-level commands by determining which blocks contain data for the particular file referenced. When the storage controller 106 receives the command 104, the storage controller 106 determines that the command 104 results in a block being freed and notifies the insertion unit 110 of the particular block identifier ('833', in this case).

At stage B, the insertion unit 110 appends the block identifier (received at stage A) to the active log 118. The insertion unit 110 can append the block identifier to the active log 118 by writing the block identifier to a memory or other storage location associated with the active log 118. For example, the insertion unit 110 can maintain a file pointer that indicates the location on a storage device that is immediately after the location in which a previous block identifier was inserted into the active log 118.

The active log 118 can be divided into subsets. In this particular example, the active log 118 is divided into subsets #0, #1, and #2. The maximum size of the subsets is fixed at four block identifiers. In practice, the subsets are typically much larger (e.g., $1.25 \times 2^{20}$ block identifiers) and the subset size might be variable. In this particular example, insertion unit 110 appends block identifier 833 to the active log 118, resulting in subset #3 having three block identifiers.

The insertion unit 110 also tracks, or otherwise determines, the size of the active log 118 and the status of the individual subsets. In particular, the insertion unit 110 determines when the size of the active log 118 reaches a particular threshold and, similarly, when a particular subset reaches a particular size threshold. The size threshold for the active log 118 and the subsets can be measured in various units, such as bytes or counts of block identifiers. In other words, the size threshold for each subset might be one megabyte or $1.25 \times 2^{20}$ block identifiers.

If the insertion unit 110 determines that a subset has reaches the particular threshold, the operations depicted at stages C and D are performed. If the insertion unit 110 determines that the active log 118 has reached the particular threshold, the operations depicted at stages E, F, and G are performed.

At stages C and D, the insertion unit 110 notifies the sort unit 112 that a particular subset has reached the particular threshold and the sort unit 112 sorts the block identifiers in the particular subset.

At stage C, the insertion unit 110 notifies the sort unit 112 that subset #1 has reached the size threshold (four block identifiers, in this example) in response to appending a block identifier to the active log 118 that constitutes the fourth block identifier of subset #1. In this particular case, stage C would occur after the insertion unit 110 inserted block identifier 484 into the active log 118.

When the insertion unit 110 notifies the sort unit 112 that a particular subset has reached the particular threshold, the insertion unit 110 can identify the particular subset in a variety of ways. For example, the particular subset can be identified by the subset number (in this case, '1'). When the subsets are fixed size, the initial entry associated with the subset can be identified by multiplying the subset number by the fixed subset size (or similar technique adapted for a particular configuration). The particular subset can also be identified by indicating which entries in the active log 118 correspond to the subset. For example, subset #1 could be identified as entries four through seven (assuming zero-based numbering). The insertion unit 110 can also include a file pointer or other means to access the active log 118 with the notification.

At stage D, the sort unit 112 sorts the subset identified by the insertion unit 110 at stage C. In particular, the sort unit 112 sorts the block entries of the subset relative to each other, such that the block identifiers contained in the subset are in ascending order. The particular sorting technique used, such as a quicksort or mergesort algorithm, can vary depending on the storage system configuration, including the number of entries in a subset, whether the subset can be stored entirely in memory, etc.

The subset remains in the same position within the active log 118 after being sorted. In other words, the entries within the subset are merely reordered. For example, subset #1 is depicted in FIG. 1 as being unsorted in the active log 118, but sorted in the inactive log 120. Subset #1 in the inactive log 120 still comprises entries four through seven, as in the active log 118. It should be noted that while FIG. 1 depicts subset #1 as being unsorted in the active log 118 and sorted in the inactive log 120, the roles of active log and inactive log are independent from the sorting of subsets. Thus, after stage D, subset #1 can be sorted while in the active log 118 remains the active log (similar to the depiction of subset #0).

At stages E, F, and G, the active log 118 becomes the inactive log 120, the insertion unit 110 notifies the sort unit 112 that the last subset of the (now) inactive log 120 should be sorted, and the sort unit 112 sorts the last subset of the inactive log 120.

At stage E, the block free unit 108 (or other component, such as the insertion unit 110), in response to determining that the active log 118 has reached a particular threshold, performs a log switch, making the active log 118 the inactive log 120. In effect, the role of the active log 118 is changed such that block identifiers are no longer appended to the active log 118, thus making the active log 118 "inactive". Once the active log 118 is made the inactive log 120, a previous inactive log is made the new active log, to which new block identifiers are appended. Thus, the active log 118 becomes the inactive log 120 at stage E. The actual log switch is described in more detail below.

At stage F, the insertion unit 110 notifies the sort unit 112 that the last subset of the inactive log 120 is to be sorted. Similar to the operations described above at stage C, the insertion unit 110 can identify the particular subset in a variety of ways. Similarly, the insertion unit 110 can identify that the subset is for the inactive log 120 instead of an active log.

At stage G, the sort unit 112 sorts the last subset (subset #2) of the inactive log 120. To sort subset #2, the sort unit 112 can perform operations substantially similar to those described above at stage D. The sort unit 112 might also utilize different operations. For example, the active log 118 might have reached the particular threshold prior to subset #2 reaching the size threshold, as depicted here. Thus, subset #2 can include fewer block identifiers than the other subsets, which might make different sorting algorithms more advantageous. Regardless, after stage G, subset #2 is sorted in ascending order like the other subsets of the inactive log 120.

At stage H, the sort unit 112 notifies the sorted merge unit 114 that all subsets of the inactive log 120 are sorted. The notification can include a mechanism for the sorted merge unit 114 to access the inactive log 120, such as a file pointer. Including a file pointer or other mechanism to access, or identify, the inactive log 120 facilitates the use of multiple logs that alternate between the active and inactive roles. Thus, the sort unit 112 indicates to the sorted merge unit 114 which of the multiple logs is currently the inactive log.

At stage I, the sorted merge unit 114 merges the sorted subsets of the inactive log 120 and generates the sorted log 122. To generate the sorted log 122, the sorted merge unit 114 utilizes a modified heapsort. To utilize the modified heapsort, the sorted merge unit 114 generates a "min-heap" using the smallest block identifier of each subset in the inactive log 120. A min-heap is a binary heap in which a parent node is associated with a value that is less than all of the parent node's children. In the current example, the min-heap would consist of the block identifiers '42', '395', and '642', with the block identifier '42' being the root of the min-heap. As with a typical heapsort, the root element is removed (block identifier '42') and is written as the first element of the sorted log 122. The entry in the inactive log 120 corresponding to the root elements is removed from the inactive log 120 as well. A sift-up operation is performed on the min-heap, thus maintaining the min-heap properties. The next lowest block identifier from the subset associated with the removed root node is added to the min-heap as a new element. This process continues until all block identifiers are written to the sorted log 122. Because the entries in the inactive log 120 are removed as the corresponding block identifier is written to the sorted log 122, the inactive log 120 contains no block identifiers after the sorted log 122 is generated.

When removing the block identifiers from the inactive log 120, the sorted merge unit 114 performs a "hole punch". A hole punch occurs when a particular block identifier in the inactive log 120 is removed without shifting the other block identifiers in the inactive log 120 to take the place of the removed block identifier. In other words, when a particular block identifier is removed from the inactive log 120, a hole is left in the inactive log 120.

At stage J, the sorted merge unit 114 notifies the free unit 116 that the sorted log 122 has been generated. The sorted merge unit 114 can identify the sorted log 122 and/or provide a mechanism for the free unit 116 to access the sorted log 122, such as a file pointer.

At stages K, L, and M, the free unit 116 iterates through the sorted log 122 and updates metadata associated with the block identifiers. FIG. 1 depicts the storage device 124 as including the metadata, which is represented by an active map 126 and a reference count map 128. As described above, the active map 126 is a bitmap in which each bit corresponds to a particular block. If the bit is set to '0', the block is free; if the bit is set to '1', the block is allocated. The reference count map 128 is also similar to that described above, in which groups of bits correspond to individual blocks and store the count of references associated with each respective block.

Stages K, L, and M depict a single iteration through the sorted log 122. Thus, in actual operation, the free unit 116 will typically repeatedly perform the operations depicted at stages K, L, and M until there are no more block identifiers in the sorted log 122.

At stage K, the free unit 116 reads a block identifier from the sorted log 122. The free unit 116 maintains a pointer to a current block identifier in the sorted log 122. The pointer is initiated to the first block identifier ('42' in this example). After the free unit 116 reads the block identifier, the pointer is updated to point to the next block identifier ('350' in this example). Thus, to read the block identifier from the sorted log 122, the free unit 116 reads the block identifier indicated by the pointer. The pointer is then updated to point to the next block identifier.

At stage L, the free unit 116 reads data from the reference count map 128 corresponding to the block identifier read at stage K and decrements the appropriate value, then writes the data back to the reference count map 128. Because read and writes to the storage device 124 occur on a per block basis, the free unit 116 reads an entire block of data. While a block of data might be four kilobytes in size, one or two bytes might be used to store the reference count for a particular block. Thus, the free unit 116 might read a significant amount of data in order to update a small portion of that data.

When the free unit 116 decrements the reference count, the free unit 116 also determines whether the decrement results in the reference count being zero. If the reference count is zero, the free unit 116 performs the operations depicted at stage M. If the reference count is not zero, the free unit 116 does not perform the operations depicted as stage M.

At stage M, the free unit 116 reads data from the active map 126 corresponding to the block identifier read at stage K and sets the appropriate bit to '0', then writes the data back to the active map 126. As described above, a block is generally the smallest unit of storage that can be read or written to. Thus, even though only a single bit is changed to update the active map 126, an entire block is read and written in order to update a single bit.

Although the stages described above are depicted as occurring sequentially, at least some of the stages can occur in parallel. For example, once a log switch occurs (e.g., at stage E), the operations depicted at stage B can be performed with the new active log while the operations at stage G are performed using the inactive log 120. Further, the sort unit 112 might be capable of performing multiple sorts in parallel (e.g., using multiple threads or processes), allowing the operations of stage D and G to occur in parallel.

The sorted log 122 (and the subsets of the active log 118 and inactive log 120) are described and depicted as being sorted in ascending order. The illustrations herein assume that blocks are identified based on their order on the storage device 124. For example, block 1 is sequentially followed by block 2, block 2 is sequentially followed by block 3, block n is sequentially followed by block n+1, etc. In storage system configurations in which this property is not true, the sorting can occur according to a different ordering.

Additional un-depicted operations may be performed to facilitate the operations depicted in FIG. 1. For example, the block free unit 108 might not be capable of performing some operations in parallel. In other words, some operations might be mutually exclusive. For example, consider the merging of the subsets of the inactive log 120 at stage I and the freeing of the blocks at stages K through M. Actively generating the sorted log 122 while also removing block identifiers might result in unintended scenarios. For example, if the block identifiers are removed faster than they are added by the sorted merge unit 114, the free unit 116 might reach the end of the sorted log 122 and stop, even though the entire sorted log 122 has not been generated. In this, and similar scenarios, access to particular components or resources can be controlled by a state machine. For example, if the sorted merge unit 114 is actively generating the sorted log 122, the block free unit 108 might be set to a "MERGE" state. The free unit 116 can delay any attempt to free blocks while the state is set to "MERGE". Similarly, when the free unit 116 is freeing blocks, the block free unit 108 might be set to a "FREE" state. The sorted merge unit 114 would delay the generation of the sorted log 122 while the state is set to "FREE". When neither operation is occurring, the state might be set to an "IDLE" state.

The sorting of the block identifiers is, effectively, the application of a particular measure of spatial locality. Consider, for example, a linear representation of data in which the blocks of data are identified by sequential integer block identifiers (e.g., the first block is identified by block identifier '1', the second block is identified by block identifier '2', etc.). The spatial locality between a set of blocks can be measured by the difference between the blocks respective block identifiers. Thus, for example, blocks '15' and '18' have a greater spatial locality than blocks '20' and '30' (differences between the block identifiers being three and ten, respectively). Sorting the block identifiers in ascending (or descending) order effectively groups the block identifiers by the particular measure of spatial locality, minimizing the distance between the blocks associated with the block identifiers in the block logs. The ability to represent data on storage devices, such as hard disks, in a linear manner is a particular characteristic of the storage devices themselves which might not be shared between all storage devices. Thus, sorting a block log in an ascending order based on the block identifier might not be the most appropriate application of a particular measure of spatial locality. For example, a storage device might use a mechanism that benefits from spatial locality in two dimensions. In such a storage device, the particular measure of spatial locality might be the distance between blocks of data in two dimensions instead of a single dimension. Thus, the particular technique used to sort the block identifiers can vary based on a variety of factors, including the particular measure of spatial locality appropriate to the storage system.

Additionally, the sorting technique used can be combined with other techniques, such as modular arithmetic. For example, the set of available block identifiers can be divided into ranges, such as block identifiers '0'-'999', '1000'-'1999', etc. The ranges of block identifiers can be identified based on a range identifier (e.g., '0' for block identifiers '0'-'999', '1' for block identifiers '1000'-'1999', etc.). The ranges of block identifiers can then be grouped based on the associated identifier. For example, to group every other range (e.g., grouping ranges '0', '2', '4', etc. into a first group and grouping ranges '1', '3', '5', etc. into a second group), the range identifier is divided by two and ranges of block identifiers are grouped based on the remainder. Similarly, to group every four ranges, the range identifier is divided by four instead of two.

It should be noted that the sorting techniques employed during the process depicted in FIG. 1 result in particular characteristics that might not exist if a block log was not sorted until the block log reached a particular threshold. For example, if a block log with a large number of block identifiers was sorted at once, the resulting impact to performance of a controller could be significant, both by using processor cycles as well as increasing the number of read and write operations occurring on the one or more storage device(s) on which the block log were stored. However, by sorting subsets of the block identifiers individually, the cost of sorting an entire block log is amortized over a period of time, resulting in more predictable performance (or a less apparent performance impact) than sorting an entire block log at once. While an additional sort is used to merge the subsets together to form a sorted log, the resulting increase in overhead is generally less apparent to storage system clients than might occur if an entire block log were sorted at once.

While some examples of commands that can result in blocks being freed are discussed above, additional examples might be useful to further illustrate the subject matter. Consider at least one difference between a file system that updates data in place and a file system that uses a write-anywhere mechanism. When a controller writes data associated with a particular file to a file system that uses in-place updates, the controller writes the data to the same blocks that the particular file is already associated with. For example, assume that file A is stored at blocks 100-200. If a controller receives a command indicating that data for file A should be written, the controller writes the data to blocks 100-200.

A file system that uses a write-anywhere mechanism, on the other hand, functions differently. When a controller writes data associated with a particular file to a file system that uses a write-anywhere mechanism, the data is written to a set of new blocks on a storage device. Thus, for example, if file A is stored at blocks 100-200, the controller might write the data to blocks 500-600. Once the data is written, blocks 100-200 are freed. Thus, when the file system uses a write-anywhere mechanism, each write command, generally, involves freeing one or more blocks.

Further, commands issued by clients are not the only way that blocks can be freed. A controller can perform various management operations, including moving data between blocks on a storage device, which can result in blocks being freed. Further, other components of a storage device might issue commands (such as replication commands between nodes in a clustered storage system). In other words, there are a variety of possible reasons why a block may be freed beyond commands received from clients.

Read-Ahead Example Illustration

Figure 2:
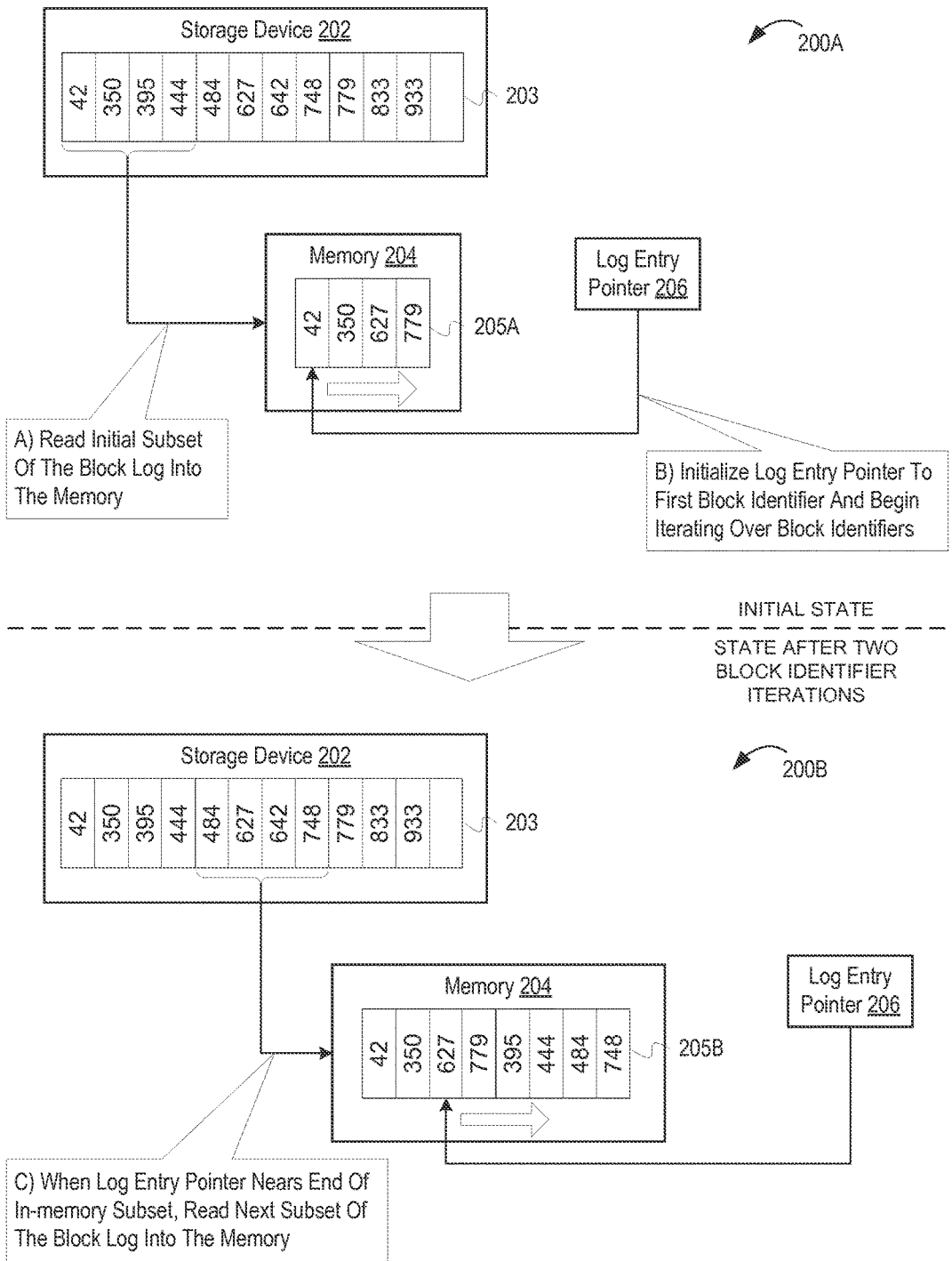
FIG. 2 is a conceptual diagram depicting the use of a read-ahead mechanism facilitated by a sorted list of block identifiers.

FIG. 2 is a conceptual diagram depicting the use of a read-ahead mechanism facilitated by a sorted list of block identifiers. FIG. 2 depicts two states 200A and 200B of a storage device 202, memory 204, and a log entry pointer 206 when using a read-ahead mechanism. The storage device 202 includes a block log 203. The memory 204, at state 200A, includes a first in-memory subset 205A of the block log 203. The memory 204, at state 200B, includes a second in-memory subset 205B of the block log 203. Each block identifier in the block log 203 is referred to as an "entry".

State 200A depicts the state of the storage device 202, memory 204, and log entry pointer 206 after stages A and B. State 200B depicts the state of the storage device 202, memory 204, and log entry pointer 206 after two block identifiers are iterated over and after the completion of stage C.

At stage A, the first four block identifiers of the block log 203 are read from the storage device 202 and stored in the memory 204. These four block identifiers, '42', '350', '627', and '779', become the first in-memory subset 205A. Typically, the number of block identifiers read from the storage device 202 and stored in the memory 204 is greater than one. However, the particular number of entries read at stage A can be based on a variety of factors, such as the performance of the storage device 202, the performance of a computing system that includes the memory 204, etc.

At stage B, the log entry pointer 206 is initialized to the first block identifier entry and iteration over the block identifiers begins. The log entry pointer 206 can be a variable or other construct that includes an address that points to the location in the memory 204 that includes the first block identifier, '42', an offset value used to specify a particular location in memory based on a base address that points the beginning of the first in-memory subset 205A, etc. Initializing the log entry pointer 206 includes setting the log entry pointer 206 to the value that allows the first entry in the first in-memory subset 205A to be accessed.

To iterate over the block identifiers, the block identifier referenced by the log entry pointer 206 is read from the memory 204 and used to free the block associated with the block identifier. After the block identifier is read, the log entry pointer 206 is set to point to the next entry in the first in-memory subset 205A. Setting the log entry pointer 206 to point to the next entry can include incrementing the log entry pointer 206, adding a value to the log entry pointer 206, etc.

Stage C occurs when the log entry pointer 206 nears the end of the current in-memory subset of the block log 203. In the example depicted in FIG. 2, when the log entry pointer 206 is set to point to the third entry of the subset 205A, stage C occurs.

At stage C, the next four block identifiers of the block log 203 are read from the storage device 202 and stored in the memory 204. These four block identifiers, '484', '627', '642', and '748', combine with the first in-memory subset 205A to become the second in-memory subset 205B. As discussed above, the particular number of block identifiers read from the storage device 202 and stored in the memory 204 can vary.

The general process described in stages A-C is performed until all entries in the block log 203 are read into memory. Once all entries in the block log 203 are read into memory, the in-memory entries are iterated over until the end of the in-memory block log is reached.

Reading block identifiers from the block log 203 into the memory 204 prior to the log entry pointer reaching the end of the particular in-memory subset prevents the iteration from halting while additional block identifiers are read into the memory 204. In other words, if the log entry pointer 206 were to reach the last entry of the first in-memory subset 205A before the second set of four entries were read from the storage device 202 and stored into the memory 204, the iterative process would halt while the four entries were read from the storage device 202. On the other hand, if the second set of four entries are read from the storage device 202 and stored in the memory 204 prior to the log entry pointer 206 reaching the last entry of the first in-memory subset 205A, the iterative process can continue without temporarily halting.

The timing associated with reading additional entries from the storage device 202 can be determined by estimating (or calculating) the amount of time it takes to read the entries from the storage device 202 and store them in the memory 204. For example, if it takes fifty milliseconds to read a set of entries from the storage device 202 and store them in the memory 204, the entries can be read approximately fifty milliseconds before the log entry pointer 206 reaches the end of the current in-memory subset. Thus, various characteristics can factor into determining the timing of when additional entries are read from memory, including the rate at which the entries are being iterated over (i.e., processor speed, etc.) and the performance of the storage device 202 and the memory 204.

It should be noted that while the entries of the block log 203 and the in-memory subsets are depicted as being arranged linearly, in practice they may be located in non-contiguous locations. For example, a virtual memory system might make the second in-memory subset 205B appear to be in contiguous memory locations while some portions of the second in-memory subset 205B are actually stored in physical memory locations that are not adjacent to other portions of the second in-memory subset 205B.

Further, while FIG. 2 depicts the in-memory subsets as containing all previous entries that have been iterated over, some configurations can allow the iterated-over entries be replaced or overwritten by additional data. For example, the in-memory subsets might be stored in the memory 204 as a ring buffer. Thus, old entries in the memory 204 might be overwritten by new entries, decreasing the amount of memory used by the in-memory subsets.

Log Switch Example Illustration

As described above, once an active log reaches a certain size threshold, the active log is made "inactive" and replaced by a new, empty active log. This functionality can be implemented using two block logs. When initialized, both block logs are empty, and a first of the block logs is designated as the active log. An insertion unit then begins appending new block identifiers to the active log. Once the first block log reaches the size threshold described above, the first block log is designated as the inactive log and the second of the block logs is designated as the active log. The insertion unit then appends new block identifiers to the second block log.

Once the first block log is designated as the inactive log, the first block log is processed to generate the sorted log. As entries are added to the sorted log, the corresponding entries are removed from the first block log until the first block log is empty. Once the second block log reaches the size threshold, the log switch is performed again. The block logs can be implemented as log files on a storage device.

Figure 3:
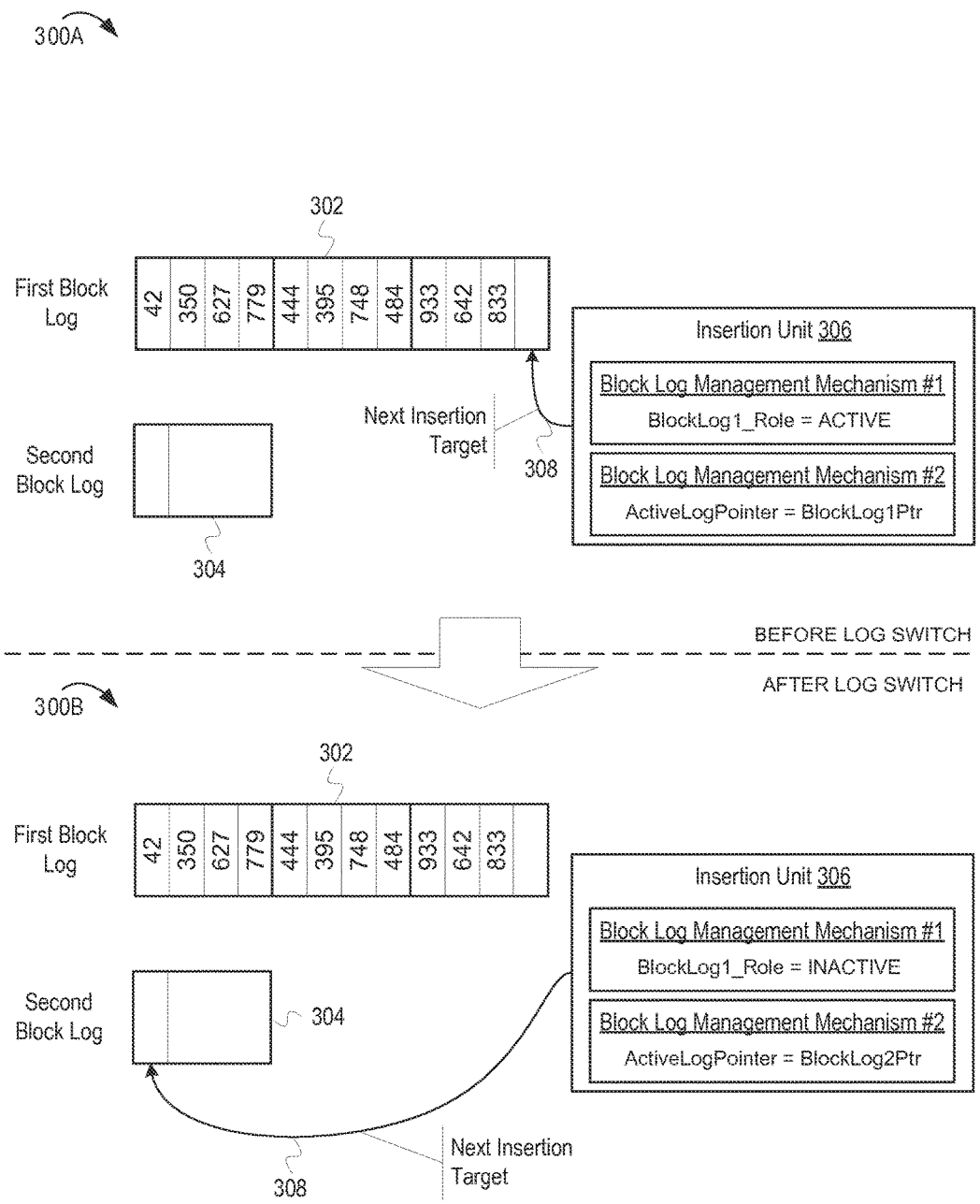
FIG. 3 is a conceptual diagram depicting the performance of a log switch between two different block logs.

FIG. 3 is a conceptual diagram depicting the performance of a log switch between two different block logs. FIG. 3 depicts a first block log 302, second block log 304, and insertion unit 306. Insertion unit 306 includes a pointer 308 to the insertion target location of the current active log file. State 300A depicts the state of the first block log 302, second block log 304, and insertion unit 306 before the log switch is performed but after block identifiers have been inserted into the first block log 302. State 300B depicts the state of the first block log 302, second block log 304, and insertion unit 306 after the log switch is performed. FIG. 3 also depicts two possible mechanisms, block log management mechanisms #1 and #2, for tracking which block log is the active log. The mechanisms are not mutually exclusive, and other mechanisms might be used.

Prior to the log switch, as depicted at state 300A, the first block log 302 is the active log. The second block log 304 is the inactive log. Block log management mechanism #1 uses a status variable ("BlockLog1_Role") to indicate the particular role of the first block log 302. Because the first block log 302 is the active log, the status variable "BlockLog1_Role" is set to "ACTIVE". Block log management mechanism #2 uses a pointer ("ActiveLogPointer") to indicate which block log is the active log. Because the first block log 302 is the active log, the pointer "ActiveLogPointer" is set to the pointer to the first block log ("BlockLog1Ptr"). Additionally, the next insertion target 308 is at the tail of the first block log 302.

After the log switch, as depicted at state 300B, the second block log 304 is the active log and the first block log 302 is the inactive log. Accordingly, for block management mechanism #1, the status variable "BlockLog1_Role" is set to "INACTIVE". Similarly, for block management mechanism #2, pointer "ActiveLogPointer" is set to the pointer to the second block log ("BlockLog2Ptr"). Additionally, the next insertion target 308 is set to the tail of the second block log 304.

One characteristic of both block management mechanisms is the use of a single indicator ("BlockLog1_Role" or "ActiveLogPointer") to indicate which of the block logs is the active log. The indication that one of the two block logs is the active log means that, by default, the other block log is the inactive log. The use of a single indicator allows the log switch to occur atomically (or nearly atomically, as other operations may be performed depending on the specific configuration).

Example Operations for Freeing Blocks

Figure 4:
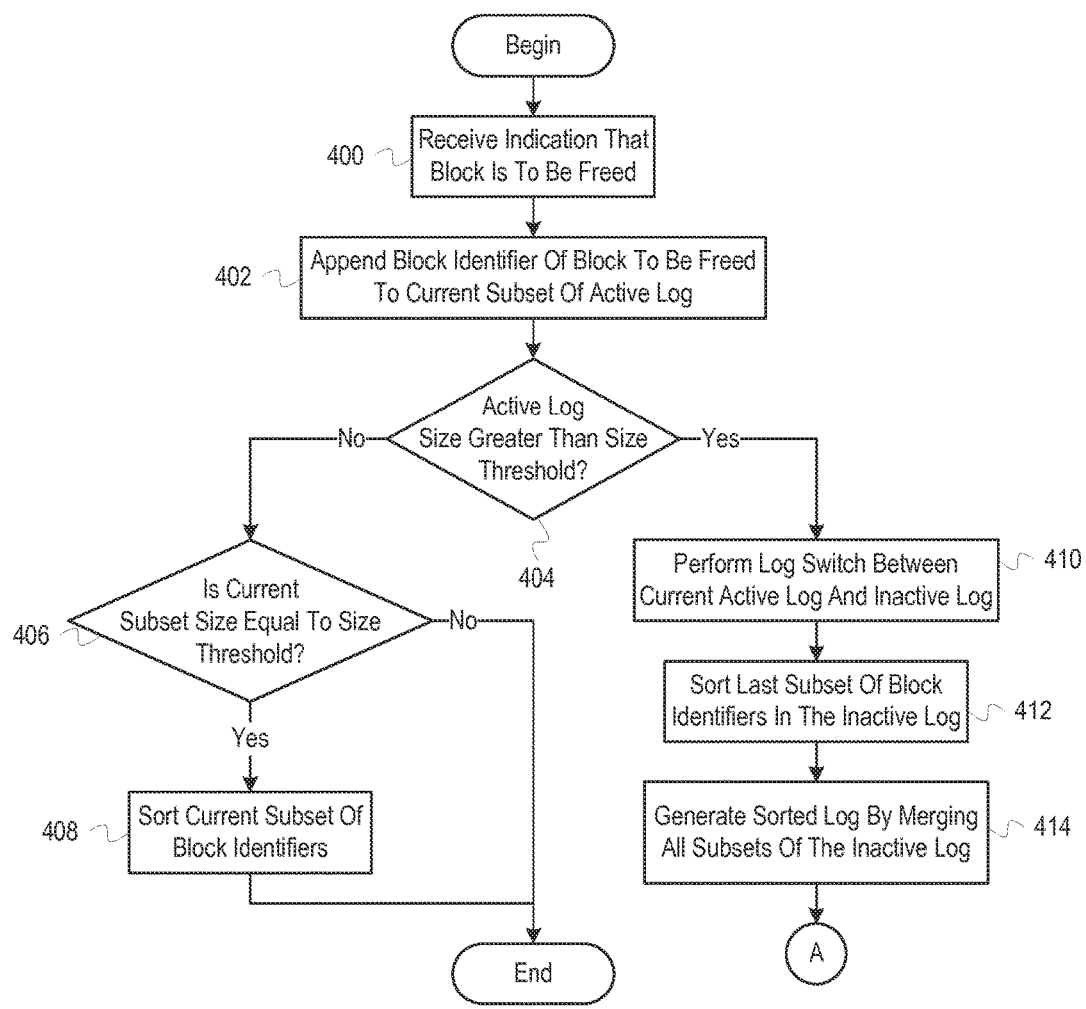
FIG. 4 is a flowchart depicting example operations for appending block identifiers to an active log, performing a log switch, and sorting subsets of the active log.
Figure 5:
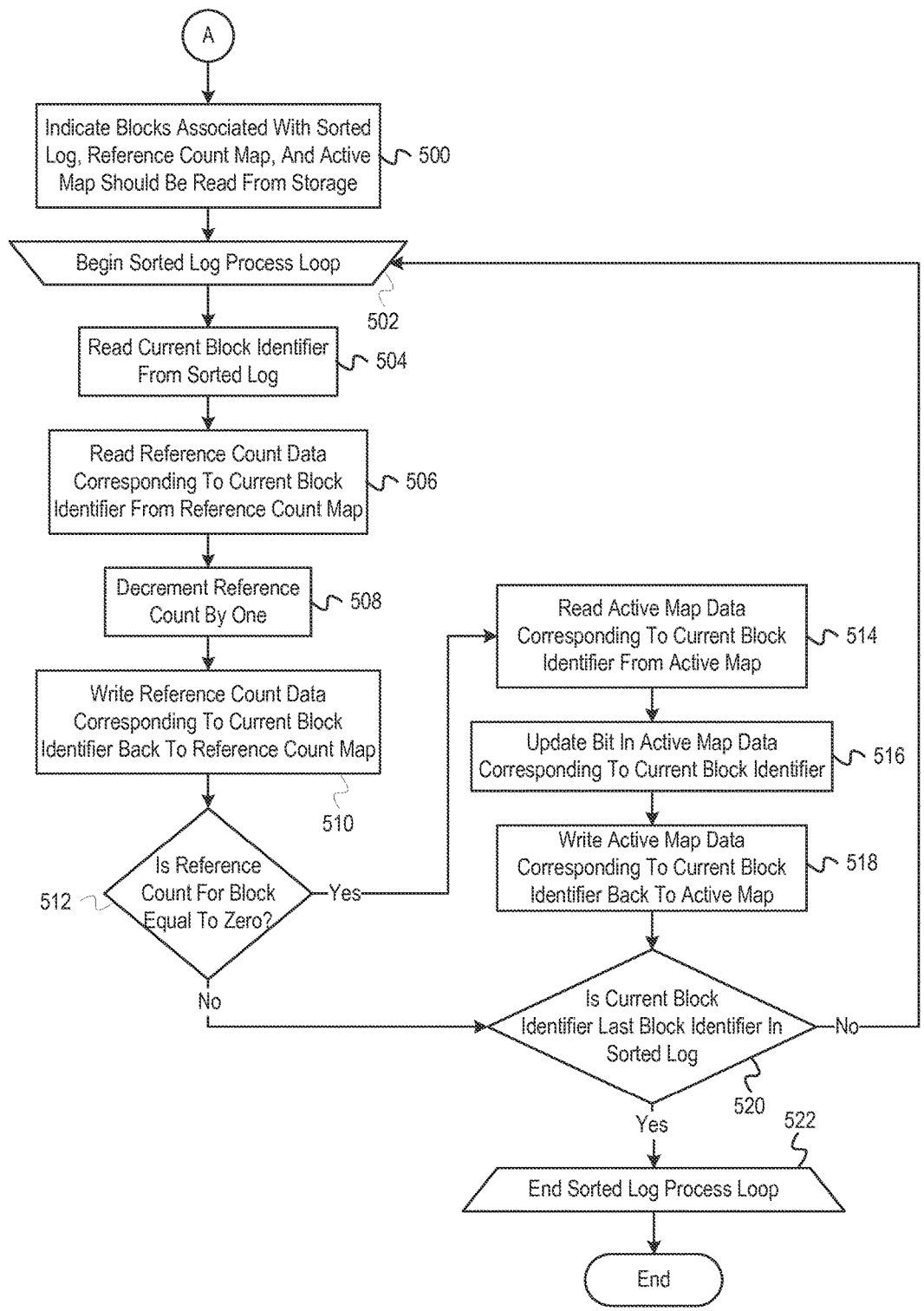
FIG. 5 is a flowchart depicting example operations for updating metadata associated with freed blocks indicated in a sorted log.

FIGS. 4 and 5 are flowcharts depicting example operations for appending block identifiers to a block log, generating a sorted log, and freeing the blocks identified in the sorted log.

FIG. 4 is a flowchart depicting example operations for appending block identifiers to a block log, performing a log switch, and sorting subsets of the block log. The example operations depicted in FIG. 4 can be performed by a block free unit, such as the block free unit 108 depicted in FIG. 1, or another component.

At block 400, a block free unit receives an indication that a block is to be freed. The indication can come from a client, another component communicatively coupled to the block free unit, etc. The indication includes at least a block identifier that identifies the block to be freed. After the block free unit receives the indication that the block is to be freed, control then flows to block 402.

At block 402, the block free unit appends the block identifier of the block to be freed (hereinafter "block identifier") to a current subset of an active log. To facilitate appending the block identifier, the block free unit maintains a pointer to the active log. The pointer can point to the specific location in the active log that the block identifier should be written to or point to the beginning of the active log. If the pointer points to the beginning of the active log, the block free unit can maintain an offset that indicates where in the active log, relative to the pointer, the block identifier should be written. In other words, the pointer might point to entry '0' of the active log, while the offset specifies that the block identifier should be written to entry '20'.

As described above, the active log is divided into subsets. Once a subset reaches a maximum subset size, the next block identifier appended becomes the next subset. Thus, the block free unit might also maintain an indication of the size of the current subset. The various data used by the block free unit, such as a pointer, offset, and/or subset size count can be updated when the block free unit appends the block identifier to the active log. After the block free unit appends the block identifier to the current subset of the active log, control then flows to block 404.

At block 404, the block free unit determines whether the active log size is greater than a threshold. To determine whether the active log size is greater than the threshold, the block free unit compares an indication of the active log size with the threshold. The block free unit can maintain the indication of the active log size or might query a file system or storage device to determine the active log size. The threshold can be preconfigured, determined dynamically, or a combination thereof. For example, the threshold might be a percentage of available space on one or more storage devices. The particular percentage might be preconfigured while the actual threshold is dynamically determined by determining the amount of available space and multiplying the amount of available space by the particular percentage. The block free unit can then compare the threshold with the size of the active log. If the block free unit determines that the active log size is not greater than the threshold, control then flows to block 406. If the block free unit determines that the active log size is greater than the threshold, control then flows to block 410.

At block 406, the block free unit determines whether the current subset size is equal to a size threshold. To determine whether the current subset size is equal to the threshold, the block free unit compares an indication of the current subset size to the threshold. The current subset size can be maintained and updated as block identifiers are inserted into the active log. In some configurations, the block free unit might not maintain the actual size of the current subset. For example, as described above, the block free unit might maintain an offset that indicates where in the active log a block identifier should be appended. In such an instance, the block free unit can determine whether the current subset size is greater than the threshold by performing a modulo operation using the offset and the maximum subset size. For example, assuming a zero-based offset, each time the remainder of the offset divided by the threshold is zero (after the first block identifier is inserted), the current subset is equal to the threshold. If the block free unit determines that the current subset size is equal to the threshold, control then flows to block 408. If the block free unit determines that the current subset size is not equal to the threshold, the process ends.

At block 408, the block free unit sorts the current subset of block identifiers. To sort the current subset of block identifiers, the block free unit reads the block identifiers in the active log that correspond to the current subset and performs one or more sort operations on the block identifiers. The particular sort operation(s) can vary. For example, the specific sort operation(s) can change based on the particular sorting algorithm, such as quicksort or mergesort, used to sort the block identifiers. The sorted block identifiers are written back to the active log in the same set of entries from which they were read. After the block free unit sorts the current subset of block identifiers, the process ends.

Control flowed to block 410 if it was determined, at block 404, that the active log size is greater a threshold. At block 410, the block free unit performs a log switch between the active log and an inactive log. To perform the log switch, the block free unit updates one or more indications to indicate that the inactive log is the new active log (or vice versa). For example, as described above, the block free unit might set a status variable indicating that a particular block log is now the active log, thus also indicating that a second block log is now the inactive log. After the block free unit performs the log switch between the active log and the inactive log, control then flows to block 412.

At block 412, the block free unit sorts the last subset of block identifiers of the inactive log. To sort the last subset of block identifiers of the inactive log, the block free unit can perform operations substantially similar to those described at block 408. After the block free unit sorts the last subset of block identifiers of the inactive log, control then flows to block 414.

At block 414, the block free unit generates a sorted log by merging all subsets of the inactive log into a single sorted log. The block free unit can generate the sorted log by utilizing a modified heapsort algorithm. As each block identifier from the inactive log is added to the sorted log, the block identifier is removed from the inactive log. Thus, when the generation of the sorted log is completed, the inactive log contains no more block identifiers. The use of a heapsort algorithm to merge the subsets of the inactive log into the sorted log is described in greater detail below. After the block free unit generates the sorted log by merging all subsets of the inactive log into a single sorted log, control then flows to block 500 of FIG. 5.

FIG. 5 is a flowchart depicting example operations for updating metadata associated with freed blocks indicated in a sorted log. The example operations depicted in FIG. 5 can be performed by a block free unit, such as the block free unit 108 depicted in FIG. 1, or another component.

Control flowed to block 500 after the block free unit generated, at block 414 of FIG. 4, the sorted log by merging all subsets of the inactive log into the single sorted log. At block 500, the block free unit indicates that blocks associated with the sorted log, the reference count map, and the active map should be read from storage. For example, the block free unit might determine block identifiers associated with the blocks at which the sorted log, reference count map, and active map are stored. The block free unit might then send the determined block identifiers to another process or component, which can initiate the reading of the data associated with the sorted log, reference count map, and active map from one or more storage devices. This allows the process of reading the associated data into memory to begin prior to actually accessing the data, thus mitigating the amount of time the block free unit waits for data to load. As another example, the block free unit might send identifiers for the sorted log, reference count map, and active map instead of individual block identifiers. After the block free unit indicates that blocks associated with the sorted log, the reference count map, and the active map should be read from storage, control then flows to block 502.

At block 502, the block free unit begins a loop in which the sorted log is processed. During the initial pass through block 502, the block free unit initializes a current block identifier pointer to refer to the first entry in the sorted log. On subsequent passes through block 502, the block free unit updates the current block identifier pointer to refer to the next entry in the sorted log. In some storage systems, the current block can be identified using a pointer to sorted log (e.g., a pointer to the first entry in the sorted log) and an offset value that indicates the specific entry of the sorted log that is the current block identifier. After the block free unit initializes or updates the current block identifier pointer, control then flows to block 504.

At block 504, the block free unit reads the current block identifier from the sorted log. The current block identifier is indicated by the current block identifier pointer that was initialized or updated at block 502. The current block identifier pointer indicates the location in memory at which the current block identifier is stored (which was stored in memory by the operations depicted at blocks 500 through 508). Thus, the block free unit reads the memory location indicated by the current block identifier pointer. After the block free unit reads the current block identifier from the sorted log, control then flows to block 506.

At block 506, the block free unit reads, from a reference count map, reference count data corresponding to the current block identifier. As described above, the reference count map indicates the reference count for each block, with each location in the reference count map corresponding to a particular block. Thus, if the reference count is stored as a byte, the first byte corresponds to the first block, the second byte corresponds to the second block, the nth byte corresponds to the nth block, etc. Thus, the block free unit reads the particular portion of the reference count map that corresponds to the current block identifier.

The reference count map, however, is generally subject to the same input/output configuration as other data. Thus, instead of reading the particular byte corresponding to the current block identifier, the block free unit reads a block of data that includes the corresponding byte. For example, if the current block identifier is '150' and the block size is 100 bytes, the block free unit actually reads bytes 100 through 199 in order to access the single byte for block '150'. After the block free unit reads the reference count data corresponding to the block identifier, control then flows to block 508.

At block 508, the block free unit decrements the reference count associated with the current block identifier. In particular, the block free unit decrements the reference count associated with the current block identifier by one, indicating that one of the references to the particular block identified by the current block identifier has been freed. After the block free unit decrements the reference count associated with the current block identifier, control then flows to block 510.

At block 510, the block free unit writes the reference count data corresponding to the current block identifier back to the reference count map. In other words, in decrementing the reference count at block 508, the block free unit updates the data read from the reference count map at block 506. The block free unit now stores the updated data back to the reference count map. To do so, the block free unit can write the data to the same location from which the reference count data was read. After the block free unit writes the reference count data corresponding to the current block identifier back to the reference count map, control then flows to block 512.

At block 512, the block free unit determines whether the reference count for the block identified by the current block identifier is equal to zero. Determining whether the reference count for the block identified by the current block identifier is equal to zero allows the block free unit to determine whether the block should be indicated as free. In other words, if there are still one or more references referring to the block, the block is not truly freed. Thus, if the reference count is not zero, the block free unit need not continue to update any metadata that indicates whether the block is actually free (i.e., available to be allocated). If the block free unit determines that the reference count for the block identified by the current block identifier is equal to zero, control then flows to block 514. If the block free unit determines that the reference count for the block identified by the current block identifier is not equal to zero, control then flows to block 518.

At block 514, the block free unit reads active map data corresponding to the current block identifier from an active map. As described above, the active map is a bitmap in which each bit corresponds to a respective block. If a bit corresponding to a particular block is set to '0' the particular block is free. Because the block free unit determined that the reference count to the block corresponding to the current block identifier is equal to zero, the block free unit can update the active map data to indicate that the block is free.

The block free unit can read the active map data in a manner substantially similar to that used to read the reference count data at block 506. Similarly, the block free unit generally does not read a single bit, but reads a block of data that includes the bit for the block corresponding to the current block identifier. After the block free unit reads the active map data corresponding to the current block identifier from the active map, control then flows to block 516.

At block 516, the block free unit updates the bit in the active map data corresponding to the current block identifier. The block free unit can update the bit in various ways depending on the configuration. For example, the block free unit might explicitly set the bit corresponding to the current block identifier to a particular value ('0' in this example). As another example, the block free unit might apply a bit mask to the active map data that results in the changing of the individual bit to the appropriate value. More particularly, assume that the active map data is '011010' in binary and that the third bit is the particular bit corresponding to the current block identifier. Performing a bitwise-AND operation using the bitmask '110111' results in updated active map data '010010'. Thus, the bit corresponding to the current block identifier is set to '0'. After the block free unit updates the bit in the active map data corresponding to the current block identifier, control then flows to block 518.

At block 518, the block free unit writes the active map data corresponding to the current block identifier back to the active map. The block free unit can write the active map data back to the active map using operations substantially similar to those used to write the reference count data back to the reference count map at block 510. After the block free unit writes the active map data corresponding to the current block identifier back to the active map, control then flows to block 518.

At block 520, the block free unit determines whether the current block identifier is the last block identifier in the sorted log. The block free unit can determine whether the current block identifier is the last block identifier in the sorted log by determining the number of entries in the sorted log. The block free unit can then compare the current block identifier pointer with the memory location corresponding to the last entry in the sorted log. If the current block identifier pointer refers to the memory location corresponding to the last entry in the sorted log, the current block identifier is the last block identifier in the sorted log. If the block free unit determines that the current block identifier is the last block identifier in the sorted log, control then flows to block 522. If the block free unit determines that the current block identifier is not the last block identifier in the sorted log, control then flows back to block 502.

At block 522, the loop in which the sorted log is processed ends and the operations depicted at blocks 502 through 518 end.

Example Operations for Generating a Sorted Log

As described above, the block free unit can utilize a modified heapsort algorithm to merge the subsets of block identifiers in the inactive log into a single sorted log. In a typical heapsort algorithm, all elements of a list of elements are used to create a binary heap. The nodes of the binary heap are ordered relative to their children based on either a less-than-or-equal-to or greater-than-or-equal-to relationship (corresponding to a min-heap or max-heap, respectively). For example, if ordered based on a less-than-or-equal-to relationship, each parent node is less than or equal to its child nodes. To create the sorted list, the root node is removed and added to the list. The root node is then replaced by the last leaf node, which is sifted down until the particular order property is restored.

Instead of adding all block identifiers in the inactive log to the binary heap initially, the block free unit adds the first block identifier of each subset to the binary heap. As root nodes are removed to generate the sorted log, the block free unit adds the next block identifier from the same subset associated with the removed block identifier. In other words, if the root node contains the fifth block identifier from the sixth subset of block identifiers, the next node added to the binary heap is the sixth block identifier from the sixth subset of block identifiers.

Figure 6:
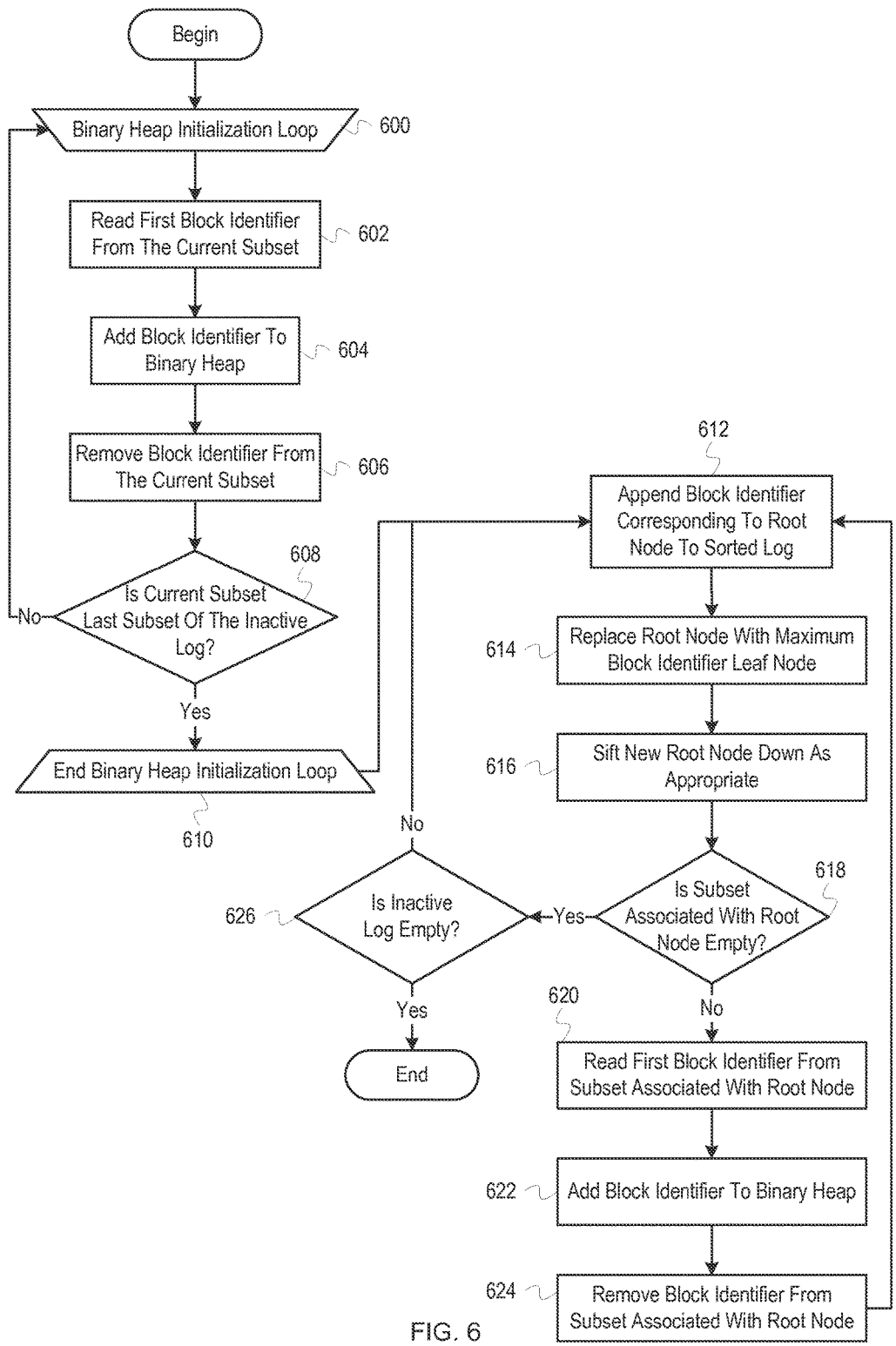
FIG. 6 is a flowchart depicting example operations for generating a sorted log by merging multiple sorted subsets of block identifiers.

FIG. 6 is a flowchart depicting example operations for generating a sorted log by merging multiple sorted subsets of block identifiers. The example operations depicted in FIG. 6 can be performed by a block free unit, such as the block free unit 108 depicted in FIG. 1, or another component. The binary heap used in the operations depicted in FIG. 6 is a min-heap, in which all child nodes are greater than the corresponding parent node, resulting in the root node being the minimum value in the binary heap.

At block 600, a block free unit initializes a binary heap with the first block identifier from each subset of block identifiers in an inactive log. During the loop, the block free unit iterates through the sorted subsets of block identifiers in the inactive log. On the initial pass through block 600, the block free unit initializes a value indicating a current subset. The current subset can be the first subset of block identifiers in the inactive log. However, the subsets can be iterated over in any order. As such, the initial current subset need not be the first subset of block identifiers in the inactive log. During subsequent passes through block 600, the block free unit updates the current subset to be the next subset of block identifiers in the inactive log. The next subset need not be based on the sequential order in which the subsets appear in the inactive log.

The block free unit can maintain a pointer for each subset that indicates the location in memory at which the respective subset resides. The block free unit can also maintain an offset for each subset that indicates which block identifier in the respective subset is the first block identifier. This data can be used to facilitate the operations depicted in FIG. 6. Additionally, the current subset can be indicated by setting a particular variable to the pointer for the particular subset. After the block free unit initializes current subset, control then flows to block 602.

At block 602, the block free unit reads the first block identifier from the current subset. The block free unit can read the first block identifier from the current subset by reading the memory location indicated by the pointer to the current subset (or a combination of the pointer and an offset). After the block free unit reads the first block identifier from the current subset, control then flows to block 604.

At block 604, the block free unit adds the block identifier to the binary heap. To add the block identifier to the binary heap, the block free unit inserts the block identifier as a leaf node. The block free unit then performs a "sift up" operation in which the node corresponding to the block identifier is swapped with its parent node while the parent node block identifier is greater. After the block free unit adds the block identifier to the binary heap, control then flows to block 606.

At block 606, the block free unit removes the block identifier from the inactive log. The block identifier can be removed from the inactive log explicitly or implicitly. To remove the block identifier from the inactive log explicitly, the block free unit can overwrite the block identifier with a default value, such as '0' or 'NULL'. To remove the block identifier from the inactive log implicitly, the block free unit can update the pointer to the current subset to reference the next block identifier in the current subset (or increment an offset indicating a current block identifier within the current subset). After the block free unit removes the block identifier from the inactive log, control then flows to block 608.

At block 608, the block free unit determines whether the current subset is the last subset of the inactive log. In other words, the block free unit determines whether all subsets of block identifiers have been iterated over. The technique used to determine whether all subsets of block identifiers have been iterated over can vary. For example, if the block free unit is iterating over the subsets linearly (as they appear in a linear representation of the inactive log), the block free unit can determine whether the current subset is the last subset in the active log. If the iteration is not based on the position of the subsets in the active log, the block free unit might reference metadata that tracks whether each particular subset has been iterated over. If the block free unit determines that the current subset is the last subset of the inactive log, control then flows to block 610. If the block free unit determines that the current subset is not the last subset of the inactive log, control then flows back to block 600.

At block 610, the binary heap initialization loop ends. At the end of the binary initialization loop, the binary heap includes the first block identifier from each subset of block identifiers in the inactive log. Because the subsets of block identifiers were previously sorted in ascending order, the binary heap contains the lowest block identifier in each of the subsets. Further, because the binary heap is a min-heap, the block identifiers in the binary heap are sorted in ascending order from root to leaf nodes. After the binary heap is initialized via the binary heap initialization loop, control then flows to block 612.

At block 612, the block free unit appends the block identifier corresponding to the root node to the sorted log. The properties of a min-heap result in the block identifier associated with the root node being the minimum block identifier of all block identifiers in the binary heap. Further, because the subset of block identifiers are already sorted, the root node of the binary heap is the minimum block identifier of all block identifiers remaining in the subsets. After the block free unit appends the block identifier corresponding to the root node to the sorted log, control then flows to block 614.

At block 614, the block free unit replaces the root node by the maximum block identifier leaf node. In other words, the root node is replaced by the last leaf node, which, due to the properties of a min-heap, is the maximum block identifier. Replacement of the root node by the leaf node results in the moving of the leaf node to the root position of the binary tree. After the block free unit replaces the root node by the maximum block identifier leaf node, control then flows to block 616.

At block 616, the block free unit sifts the new root node down in the binary heap. To sift the new root node down in the binary tree, the block free unit swaps the new root node with a child node that is less than the new root node. The block free unit continues to swap the new root node with child nodes until no child node is less than the new root node. After being sifted down, the new root node is no longer the root node, but merely part of the binary heap. After the block free unit sifts the new root node down in the binary heap, control then flows to block 618.

At block 618, the block free unit determines whether the subset associated with the block identifier written to the sorted log at block 612 is empty. To put it another way, the block identifier written to the sorted log at block 612 came from one of the subsets of block identifiers in the inactive log. The block free unit determines whether the subset of block identifiers from which the block identifier came from is empty. The particular subset from which the block identifier came from can be identified by maintaining a pointer to the subset in the node with the block identifier. If the block free unit determines that the subset associated with the block identifier is not empty, control then flows to block 620. If the block free unit determines that the subset associated with the block identifier is empty, control then flows to block 626.

At block 620, the block free unit reads the first block identifier from the subset associated with the block identifier written to the sorted log at block 612. The operations the block free unit performs to read the first block identifier from the subset can be substantially similar to those described at block 602. The first block identifier of the subset is the first block identifier remaining in the subset. In other words, the original first block identifier of the subset was removed at block 606, at which point the next block identifier becomes the first block identifier. This process is continued at blocks 620 through 624. After the block free unit reads the first block identifier from the subset associated with the block identifier, control then flows to block 622.

At block 622, the block free unit adds the block identifier read at block 620 to the binary heap. The operations performed by the block free unit to add the block identifier to the binary heap can be substantially similar to those performed at block 604. After the block free unit adds the block identifier to the binary heap, control then flows to block 624.

At block 624, the block free unit removes the block identifier read at block 620 from the inactive log. The operations performed by the block free unit to remove the block identifier from the subset can be substantially similar to those performed at block 606. After the block free unit removes the block identifier from the subset, control then flows back to block 612.

Control flowed to block 626 if it was determined, at block 618, that the subset associated with the root node is empty. At block 626, the block free unit determines whether the inactive log is empty. The inactive log is empty when all block identifiers have been removed from the inactive log. The mechanism used to determine whether the inactive log is empty can vary. For example, the block free unit might track the count of block identifiers in the inactive log. Each time a block identifier is removed, the block free unit can decrement the count. When the count reached zero the inactive log is empty.

As another example, assume that a block identifier is removed by writing a default value to the corresponding entry in the inactive log. Once the last block identifier for a particular subset is removed, the pointer is updated to refer to the beginning of the next subset. The particular entry at the beginning of the next subset, however, was set to the default value after the binary heap was initialized. Thus, the block free unit can determine that the particular subset is empty by determining that the pointer currently references an entry that is set to the default value. Thus, to determine that the inactive log is entry, the block free unit determines whether the pointer to each subset of block identifiers references an entry that is set to the default value. If the block free unit determines that the inactive log is not empty, control then flows back to block 612. If the block free unit determines that the inactive log is empty, the process ends.

Impact on Spatial Locality Example Illustration

Figure 7:
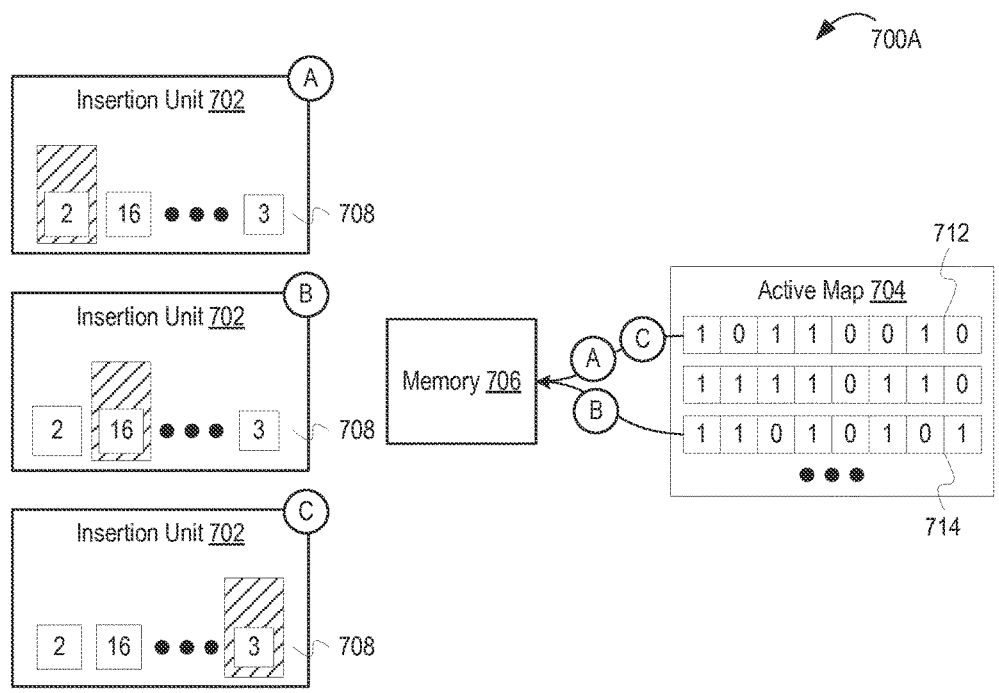
FIG. 7 is a conceptual diagram illustrating the increased spatial locality facilitated by a sorted log.
Figure 7:
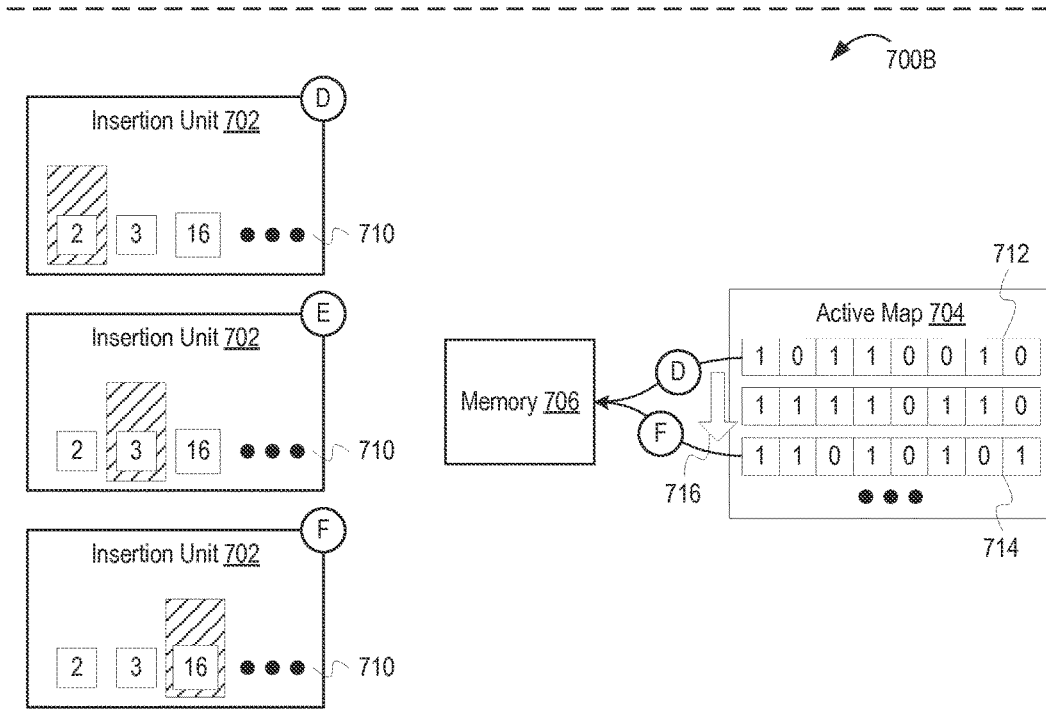

FIG. 7 is a conceptual diagram illustrating the increased spatial locality facilitated by a sorted log. FIG. 7 depicts an insertion unit 702, an active map 704, and a memory 706. A first example 700A depicts the flow of data from the active map 704 to the memory 706 when an unsorted log 708 is used to free blocks. A second example 700B depicts the flow of data from the active map 704 to the memory 706 when a sorted log 710 is used to free blocks.

The active map 704 is depicted as a set of bits arranged into bytes (eight bits). In this example, the block size is a byte, meaning that data read from the active map 704 is read in bytes. Thus, to read the bit associated with block 3, the entire first byte 712 is read into the memory 706.

The first example 700A depicts the insertion unit 702 iterating over an unsorted log 708. The unsorted log 708 includes at least block identifiers 2, 16, and 3.

At stage A, the insertion unit 702 is currently iterating over the first block identifier, 2, of the unsorted log 708. When the insertion unit 702 iterates over a particular block identifier, the insertion unit 702 reads the bit associated with that particular into the memory 706. However, because the block size is a byte, the insertion unit 702 actually reads the entire byte that contains the particular bit. Thus, at stage A, byte 712 is read into the memory 706.

At stage B, the insertion unit 702 is currently iterating over the second block identifier, 16, of the unsorted log 708. The seventieth bit of the active map is the first bit of the third byte 714 (assuming block identifiers start at zero). Thus, the insertion unit 702 reads the third byte 714 into the memory 706.

It is assumed that, between stages B and C, the insertion unit 702 has iterated over enough block identifiers that the first byte 712 is no longer in the memory 706.

At stage C, the insertion unit 702 is currently iterating over the nth block identifier, 3, of the unsorted log 708. The fourth bit of the active map is the fourth bit of the first byte 712. Thus, the insertion unit 702 reads the first byte 712 into the memory 706.

The second example 700B depicts the insertion unit 702 iterating over a sorted log 710. The sorted log 710 includes at least block identifiers 2, 3, and 16 sorted in ascending order. In this particular example, block identifiers 2, 3, and 16 are the first block identifiers in the sorted log 710.

At stage D, the insertion unit 702 is currently iterating over the first block identifier, 2, of the sorted log 710. As above at stage A, the insertion unit 702 reads the first byte 712 into the memory 706.

At stage E, the insertion unit 702 is currently iterating over the second block identifier, 3, of the sorted log 710. However, the insertion unit 702 read the first byte 712 into memory at stage D. Thus, the first byte 712 is already resident in the memory 706 and does not need to be read from the active map 704.

At stage F, the insertion unit 702 is currently iterating over the third block identifier, 16, of the sorted log 710. As above at stage B, the insertion unit 702 reads the third byte 714 into the memory 706.

The data flows depicted by the two examples 700A and 700B of FIG. 7 illustrate two particular characteristics of a sorted log. First, when the unsorted log 708 is used, it is possible that a single block is read multiple times due to the random appearance of block identifiers. In other words, even though the bits for block identifiers 2 and 3 are both in the first byte 712, the first byte 712 might be read into the memory twice 706. However, when using the sorted log 710, the first byte 712 is only read into the memory 706 once. This follows from the fact that all block identifiers associated with a particular block will come before all block identifiers associated with the next block when using the sorted log 710.

Second, when the unsorted log 708 is used, the data from the active map 704 might be read randomly. When the active map 704 is stored on certain types of storage devices, such as a hard disk, random reads can result in a performance penalty. Thus, the sorted log 710 can allow the insertion unit 702 to take advantage of sequential reads, as indicated by the arrow 716.

The examples described above do not make a distinction between blocks associated with different storage objects. A storage object is, effectively, a collection of blocks of data. Examples of storage objects include volumes, files, directories, etc. Storage objects can also be a collection of other storage objects (e.g., a volume might be a collection of files). Many aspects of the operation of a storage system can be done on a per-storage-object basis. For example, access to data can be controlled on a per-storage-object basis and metadata can be maintained on a per-storage-object basis. In other words, storage objects can be treated as individual entities. Storage objects are, generally, logical constructs, meaning that storage objects may have no correspondence with physical entities. For example, while there might be a one-to-one relationship between volumes and storage devices in some configurations, a volume might comprise data on part of a first storage device and data on part of a second storage device.

Accordingly, the operations described herein can be adapted to work on a per-storage-object basis. For example, if a storage system is configured as a set of volumes, the storage system might maintain a set of block logs for each volume (e.g., an active log, inactive log, and sorted log for each volume). Similarly, there may be a separate instance of the block free unit for each volume. Additional operations might be performed to facilitate the per-storage-object functionality, such as routing particular block free indications to the appropriate block free unit associated with the volume that contains the block identified by the block free indication.

Further, the examples described above utilize multiple log files to facilitate the operations. However, a storage system can implement similar functionality utilizing fewer or more block logs. For example, consider a storage system that utilizes a single block log. Once a certain number of subsets have been sorted, a block free unit might designate the sorted subsets as subsets that should be merged. The block free unit can then merge the subsets in place, overwriting the existing data in the subsets, instead of merging the subsets into a separate block log. The block free unit can continue to append block identifiers to the block log while the subsets are being merged. Once the subsets are merged, the block free unit can iterate through the merged block identifiers and free them as described above. The block log can be further implemented as a circular buffer in which the block free unit begins inserting the block identifiers at the beginning of the block log after the block log reaches a certain size.

Resource Reservation Example Illustrations

Some of the operations described above are at least partially dependent on the completion of later operations. For example, in a configuration that uses a single sorted log, it might not be possible to generate a new sorted log from an inactive log until the blocks identified in an existing sorted log are freed. Further, in some configurations, if the inactive log is not empty, a log switch cannot be performed. If a log switch cannot be performed and the active log has reached a maximum size, no more block identifiers can be inserted into the active log. Thus, commands that result in freed blocks might be delayed until block identifiers can be inserted into the active log again.

To state it another way, the operations to free a block can be viewed as a pipeline. Delays along the pipeline or a large number of incoming block free indications can result in delaying responses to incoming operations. As described above, small, periodic delays can be better than a single, long delay in some instances. In other words, amortizing the cost of the metadata updates over a long period of time can be less noticeable to users and less likely to cause errors.

The possibility of a large delay can be reduced by, effectively, reserving resources based on an incoming workload. For example, for each received indication that a block should be freed, a block free unit might wait until a block is freed before accepting anymore indications. Thus, instead of delaying a large number of commands at once, the block free unit ends up delay a small number of commands over a longer period of time. By tying the incoming indications to the work performed to free the identified blocks, a block free unit can cause the delay in responding to incoming operations to increase gradually. Thus, the clients (or protocols employed by the clients) can react accordingly by decreasing the rate at which operations are issued to the storage system.

In order to reserve resources based on an incoming workload ("frontend work"), a block free unit records an indication that identifies the amount of work that should be performed to free blocks ("backend work"). The indication can be a count of the number of block free indications received in a particular time period. The various components of the block free unit, such as the free unit, can then determine the amount of backend work that should be performed to compensate for the frontend work received. The indication can be individual indications for each component of the block free unit. For example, for every n block free indications received, the block free unit might indicate that 1.10×n units of work should be performed by a particular component.

A block free unit might reserve resources in particular circumstances instead of all the time. For example, the block free unit might not reserve resources until the size of one or more of the block logs reaches a particular threshold. For example, if the combined size of the active log, inactive log, and sorted log surpasses eighty percent of the maximum size of the three block logs, the block free unit might begin to reserve resources. Similarly, if the size of the one or more block logs falls below the threshold, the block free unit might stop reserving resources.

Figure 8:
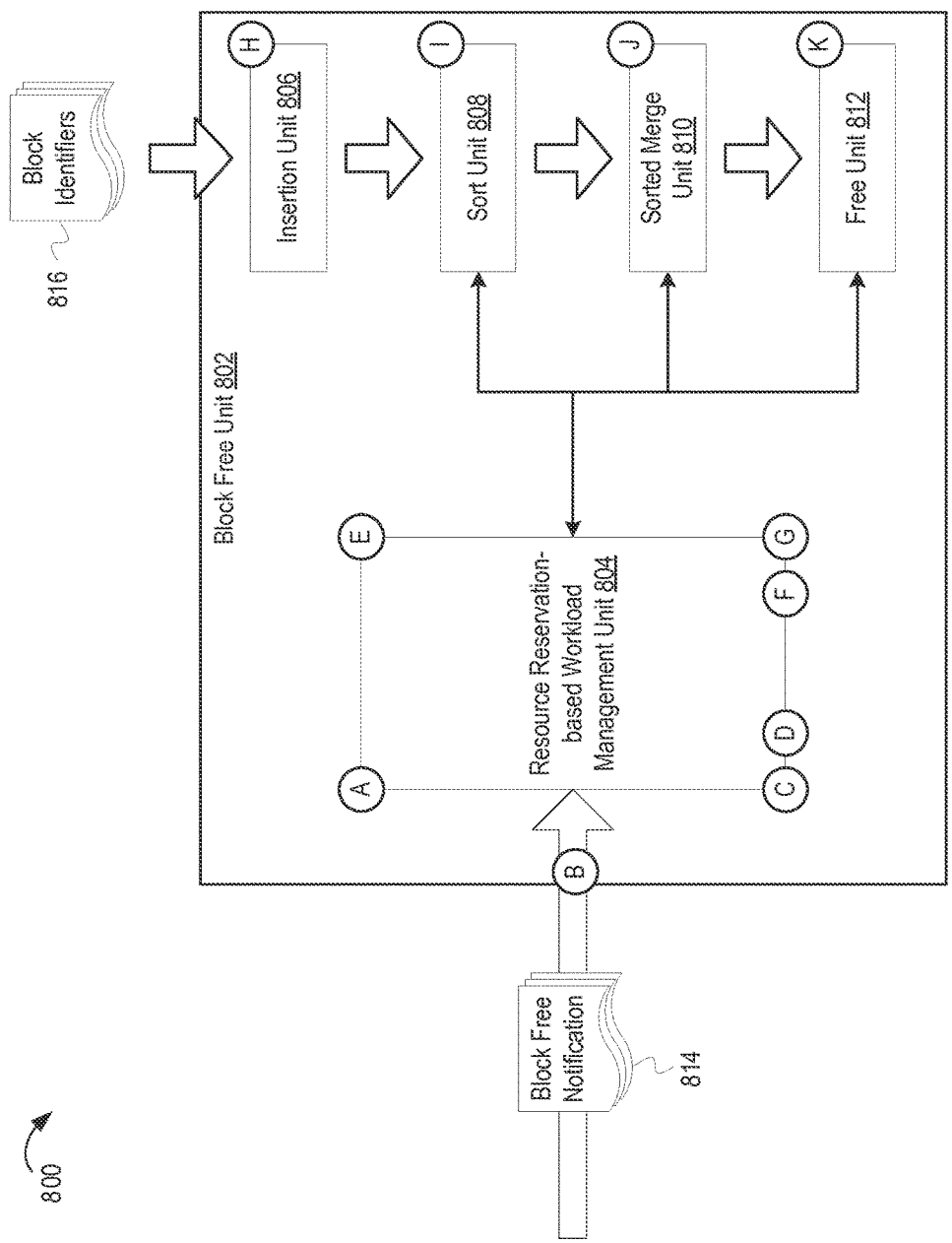
FIG. 8 depicts a block free unit with a resource reservation-based workload management unit.

FIG. 8 depicts a block free unit with a resource reservation-based workload management unit. FIG. 8 depicts a subset of a storage system 800 including a block free unit 802. The block free unit 802 includes a resource reservation-based workload management unit (hereinafter "workload management unit") 804, an insertion unit 806, a sort unit 808, a sorted merge unit 810, and a free unit 812. In this example illustration, notifications that blocks should be freed (hereinafter "notifications") 814 are received by the workload management unit 804. The workload management unit 804 tracks the received notifications 814 and performs the management operations described below.

At stage A, the workload management unit 804 monitors various statistics and data related to the operation of the block free unit 804. In this particular example, the workload management unit 804 monitors the size of the block logs employed by the block free unit 804, an active log, an inactive log, and a sorted log (none depicted). The workload management unit 804 can monitor the size of the block logs individually or as a whole. The workload management unit 804 can also monitor varies other aspects of the operation of the block free unit 804, such as the rate of incoming notifications 814 and the rate at which block metadata is updated to indicate that blocks are free. While depicted as an individual stage, the operations described at stage A are generally ongoing, meaning they can occur while operations at other stages are also being performed.

At stage B, the workload management unit 804 receives a set of n notifications 814. The n notifications 814 can be associated with specific blocks that are being freed, in which case the n notifications 814 can include the block identifiers of the specific blocks. The n notifications 814 might not be associated with specific blocks; instead, the n notifications 814 might just be general notifications that n blocks are going to be freed. Regardless of whether the n notifications 814 include block identifiers or not, each notification indicates that the block free unit 802 will be receiving a block identifier at some point.

At stage C, the workload management unit 804 allocates sufficient space to the active log to allow n block identifiers to be inserted into the active log. To allocate the space, the workload management unit 804 can indicate to a file system that additional data blocks should be allocated to the active log. Generally, the size of each block identifier is fixed. For example, each block identifier might be eight bytes in size. Every time the workload management unit 804 receives n notifications, the workload management unit 804 can indicate to the file system that a corresponding number of data blocks should be allocated to the active log. The particular number of notifications received prior to the workload management unit 804 can vary. For example, consider a file system that is implemented using indirect blocks, which are metadata blocks that point to a plurality of actual data blocks. Instead of indicating that the file system should allocate a data block each time a notification is received, the workload management unit 804 might indicate that the file system should allocate an indirect block to the active log once the workload management unit 804 determines that enough block identifiers will be received to fill up the data blocks associated with the indirect block.

When blocks are allocated, metadata associated with the blocks is generally stored in memory. Thus, not only does allocating the space preemptively take up space on a storage device, but also takes up memory on the controller. Thus, the workload management unit 804 effectively reserves these resources for the incoming block identifiers, making them unavailable to other operations.

At stage D, the workload management unit 804 determines that receiving n block identifiers will result in one or more active log subsets reaching a size threshold and indicates that each of the one or more subsets is to be sorted.

In other words, the workload management unit 804 determines, based on the n notifications 814, that the block identifiers associated with the n notifications 814 will cause at least one subset of the active log to reach a size threshold. The workload management unit 804 thus records an indication that one or more subsets will need to be sorted. The workload management unit 804 will typically record an indication of the specific number of subsets. For the example illustrations described herein, it will be assumed that the workload management unit 804 determines, based on the n notifications 814, that one subset will reach the threshold and that the workload management unit 804 indicates that one subset should be sorted.

At stage E, the workload management unit 804 determines that the size of the block logs has exceeded a threshold and enters "tight mode". The threshold can be a static threshold, such as one gigabyte, or a dynamic threshold, such as a percentage of the amount of space available on one or more storage devices. The threshold can also be a count of the entries in the block logs or another metric that is indicative of the block free unit workload. The workload management unit 804 can determine the size of the block logs by querying a file system, storage device, etc. The workload management unit 804 might determine the sum of the sizes of the individual blocks logs to determine the size of the block logs. Alternatively, the workload management unit 804 might determine the size of the block logs as a whole by determining the size of a folder containing the block logs, for example.

Once the workload management unit 804 determines that the block log size exceeds the threshold, the workload management unit 804 enters tight mode. In tight mode, the workload management unit 804 begins to more aggressively monitor the incoming notifications 814. In addition, the workload management unit 804 initiates resource reservation, as described below. The particular mode that the workload management unit 804 is in can be indicated by a status variable or similar mechanism.

In this particular example, the workload management unit 804 attempts to avoid a scenario in which the block free unit 802 cannot perform one or more operations that might lead to delaying the insertion of block identifiers into the active log. The size of the block logs provides a convenient mechanism to determine how near such an event may be. Consider, for example, that an increase in block log size can be caused by receiving a greater number of notifications 814 than the number of block identifiers removed from a sorted log. Similarly, a decrease in block log size can be caused by receiving a smaller number of notifications 814 than the number of block identifiers removed from the sorted log. The threshold can thus be established to allow the workload management unit 804 to begin to reserve resources prior to reaching a maximum block log size, effectively establishing a buffer prior to an event that can lead to potentially large delays.

The operations described as being performed at stages F and G are performed in response to entering tight mode and receiving the n notifications 814. While in tight mode, the operations performed at stages F and G might be performed periodically, such as each time n notifications are received, after specific intervals of time, etc. In this example, the trigger that causes the workload management unit 804 to perform the operations at stages F and G occurs after receiving the n notifications 814.

At stage F, the workload management unit 804 determines that the inactive log is being merged to generate the sorted log and indicates that at least n block identifiers should be merged into the sorted log. The specific number of block identifiers that the workload management unit 804 determines should be merged to generate the sorted log can vary. However, a typical goal is to ensure that a sufficient number of block identifiers are merged into the sorted log to allow a log swap to occur before the active log reaches a maximum size. In other words, the specific number of block identifiers should be sufficient to allow the inactive log to be cleared of block identifiers prior to the active log reaching the maximum size. The specific number of block identifiers can thus vary depending on how close the active log is to the maximum size, whether the notifications are being received at an increasing rate, etc. For example, the specific number of block identifiers might be n×k, where k is a value that will allow the inactive log to be emptied before the active log reaches the maximum size. The value k might be selected dynamically based on the aforementioned variables or statically configured based on design parameters, performance testing, etc. The workload management unit 804 can store the specific number of block identifiers that should be merged in memory.

At stage G, the workload management unit 804 determines that the sorted log is available for processing and indicates that at least n blocks should be freed. Similar to described above at stage F, a typical goal of the workload management unit 804 is to ensure that the block identifiers in the sorted log are processed at a rate sufficient to prevent a non-empty sorted log from preventing the inactive log to be merged into the sorted log. Thus, the particular number of blocks that should be freed can vary in a similar manner to the number of blocks indicated at stage F.

Stages H through K depict the operations of various components within the block free unit 802 that the components perform with resources have been reserved. In particular, stages H through K depict how the operation of the insertion unit 806, sort unit 808, sorted merge unit 810 and the free unit 812 differ from the operations described above at FIG. 1, if at all, based on the operation of the workload management unit 804.

At stage H, the insertion unit 806 receives block identifiers associated with blocks that are to be freed. The insertion unit 806 appends the block identifiers to the active log as depicted above at stage B of FIG. 1. The operations performed by the insertion unit 806 typically do not need to be modified to take advantage of the workload management unit 804. This results from the fact that the workload management unit 804 allocates sufficient space in the active log for the incoming block identifiers. Thus, the workload management unit 804 effectively ensures that the insertion unit 806 can insert the block identifiers as they are received.

At stage I, the sort unit 808 determines the number of subsets to sort and sorts the subsets accordingly. The sort unit 808 performs operations substantially similar to those of the sort unit 112 of FIG. 1. However, the sort unit 808 determines the number of subsets (and potentially which subsets) to sort by querying the workload management unit 804, which determined that one or more subsets would reach the size threshold at stage D. The actual sorting of the subsets themselves can be performed in a substantially similar manner to that described above at stage D of FIG. 1. Once a subset is sorted, the sort unit 808 can notify the workload management unit 804 that the subset has been sorted, allowing the workload management unit 804 to update any appropriate data.

At stage J, the sorted merge unit 810 determines the number of block identifiers to merge into the sorted log and performs operations to merge the number of block identifiers into the sorted log. Thus, the sorted merge unit 810 queries the workload management unit 804 to determine the number of block identifiers to merge and then performs the operations described above at stage I of FIG. 1 until an equivalent number of block identifiers are merged into the sorted log. The sorted merge unit 810 can communicate the current status of the merge operations to the workload management unit 804, including indicating the number of block identifiers merged. The workload management unit 804 can update any appropriate data to reflect the progress.

At stage K, the free unit 812 determines the number of block identifiers to process from the sorted log and performs operations to process the number of block identifiers. Thus, the free unit 812 queries the workload management unit 804 to determine the number of block identifiers to process and then performs the operations described above at stages K, L, and M of FIG. 1 until an equivalent number of block identifiers from the sorted log are processed. The free unit 812 can communicate the current status of the free operations to the workload management unit 804, including indicating the number of block identifiers processed. The workload management unit 804 can update any appropriate data to reflect the progress.

While the sort unit 808, sorted merge unit 810, and the free unit 812 ultimately perform the same operations as those described above at FIG. 1, the particular priority at which the operations are performed varies. For example, when the workload management unit 804 indicates that there is no specific amount of work to be performed by one of the components of the block free unit 802, the particular component might perform a predetermined amount of work, perform the work for a specific period of time, etc. However, when the workload management unit 804 indicates that there is a specific amount of work to be performed, the particular component instead performs the specific amount of work. In other words, the particular component effectively operates at a higher priority, potentially delaying other operations until the specific amount of work is performed.

The operations described above in relation to FIG. 1 describe the individual components within the block free unit 802 (the sort unit 808, the sorted merge unit 810, and the free unit 812) as querying the workload management unit 804 for the amount of work that should be performed. In some storage systems, the workload management unit 804 pushes the amount of work to be performed to the individual components. For example, instead of the sort unit 808 querying the workload management unit 804 for the number of subsets that are to be sorted at stage I, the workload management unit 804 can notify, at stage D, the sort unit 808 of the number of subsets that are to be sorted. The sort unit 808 can track the number of subsets that are to be sorted by accumulating the numbers specified by the workload management unit 808 and decrement the count as each subset is sorted.

The particular operations performed while in tight mode can vary. For example, FIG. 8 depicts the operations occurring at stages C and D as occurring regardless of whether the workload management unit 804 is in tight mode or not, while depicting the operations occurring at stages F and G as occurring while the workload management unit 804 is in tight mode. Storage systems can vary, however. In some storage systems, for example, all of the operations depicted at stages C, D, F, and G might occur regardless of whether the workload management unit 804 is operating in tight mode. Similarly, in some storage systems, all of the operations depicted at stages C, D, F, and G might occur only when the workload management unit 804 is in tight mode.

Further, the particular operations performed to reserve resources can vary based on the particular storage system configuration. The techniques described above can thus be adapted to perform additional or fewer operations based on the particular storage system configuration.

FIG. 8 depicts the workload management unit 804 as a central component that performs the operations related to receiving the n block free notifications. However, in some storage systems, the functionality of the workload management unit 804 can be performed by other components. For example, the operations performed by the workload management unit 804 at stage D might be performed by the insertion unit 806 itself. Similarly, the operations related to the other components of the block free unit 802 might be performed by the components themselves. The operations can be adapted accordingly. For example, each component of the block free unit 802 might receive the n notifications.

The operations described above do not explicitly delay responses to incoming operations. However, by effectively "forcing" a particular amount of work to be done, the block free unit dedicates computing resources, such as processor cycles and memory, to the freeing of the blocks. Thus, less computing resources are available for processing incoming commands from clients. By reducing the amount of resources available for processing incoming commands, the commands can take longer to process and, subsequently, respond to. As more resources are consumed by the block freeing operations and/or the rate at which the incoming commands increases, the delay in response to incoming commands increases as well.

Increasing the delay can result in a decrease in incoming commands in at least two particular ways. First, increasing the delay in responding to a command can slow the rate of dependent commands. A dependent command is a command that is only sent after receiving a response to a previous command. For example, if the same block is written to twice, the writes should be performed in sequential order. To preserve sequentially, a client can send the first write command, wait until a response is received verifying that the first write command was completed, then send the second write command. If the response to the first write command is delayed, the second write command (and subsequent write commands) will also be delayed, thus decreasing the rate at which commands are sent to the storage system.

Second, many communications protocols define parameters indicating when clients should decrease the rate at which the clients issue commands. For example, if the response time of a storage system decreases by a certain percentage, the communications protocol might specify that a client throttle the rate at which commands are sent to the storage system by a proportional amount.

Thus, by reserving resources for processing based on the incoming workload, a storage system can effectively cause clients to decrease the rate at which they send commands to the storage system. Because the operations can result in a gradual increase in response delay, there is a lower chance that fatal errors occur or the decrease in performance becomes noticeable to a user.

Example Operations for Reserving Resources for Freeing Blocks

Figure 9:
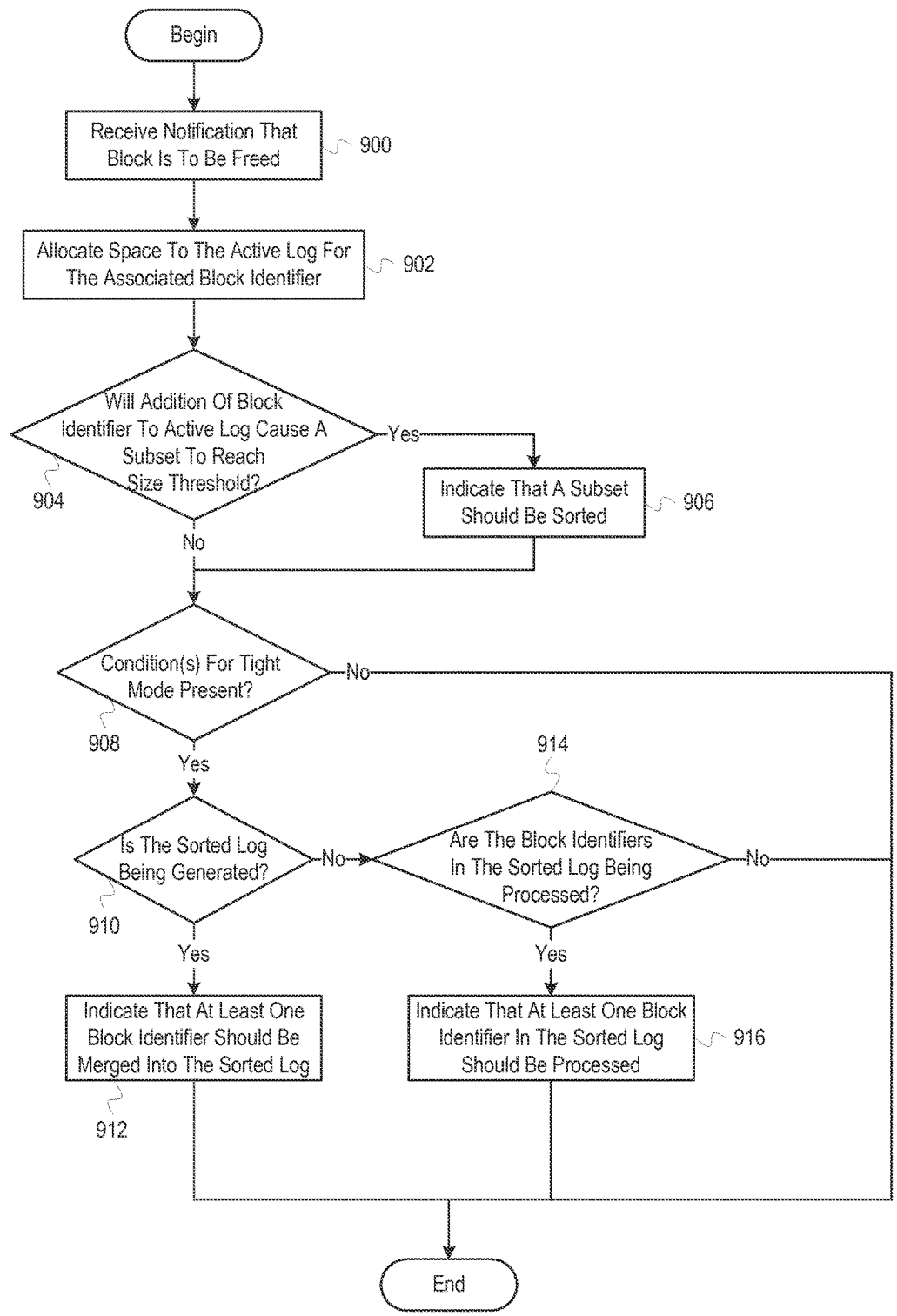
FIG. 9 is a flowchart depicting example operations for reserving resources to free blocks.

FIG. 9 is a flowchart depicting example operations for reserving resources to free blocks. The example operations depicted in FIG. 9 can be performed by a block free unit, such as the block free unit 108 depicted in FIG. 1, or another component.

At block 900, a block free unit receives a notification that a block is to be freed. The notification can include a block identifier and can come from a storage system client, a storage system component, etc. After the block free unit receives the notification that the block is to be freed, control then flows to block 902.

At block 902, the block free unit allocates space to the active log for the associated block identifier. The block free unit can allocate the space to the active log by allocating a sufficient number of data blocks to the active block to hold a block identifier. If data blocks are larger than block identifiers, the block free unit might only allocate space to the active log if there is insufficient space to otherwise add a new block identifier to the active log. To allocate the space to the active log, the block free unit might perform operations in conjunction with a file system component (such as a file system manager). After the block free unit allocates space to the active log for the associated block identifier, control then flows to block 904.

At block 904, the block free unit determines whether the addition of a block identifier to the active log will cause a subset of the active log to reach a particular size threshold. For example, to determine whether the subset will reach the size threshold, the block free unit can track, or otherwise determine, the number of block identifiers currently in the subset and/or pending insertion into the subset (including the notification received at block 902) and compare the number of block identifiers to the size threshold. The size threshold might also be based on a quantity of data, such as bytes, instead of or in conjunction with a count of block identifiers. If the number of block identifiers is equal to the size threshold, the block free unit determines that the addition of the block identifier will cause the subset to reach the size threshold. If the block free unit determines that the addition of a block identifier to the active log will cause a subset of the active log to reach the particular size threshold, control then flows to block 906. If the block free unit determines that the addition of a block identifier to the active log will not cause a subset of the active log to reach the particular size threshold, control then flows to block 908.

At block 906, the block free unit indicates that a subset should be sorted. Typically, the block free unit maintains a count of the number of subsets that should be sorted. To indicate that a subset should be sorted, the block free unit can increment the count of the number of subsets that should be sorted. The block free unit might also maintain a data structure that indicates which specific subsets should be sorted. In such instances, the block free unit can add an indication of the specific subset that should be sorted to the data structure that indicates which specific subsets should be sorted. After the block free unit indicates that a subset should be sorted, control then flows to block 908.

Control flowed to block 908 if it was determined, at block 904, that the addition of a block identifier to the active log will cause a subset of the active log to reach the particular size threshold. Control also flowed to block 908 from block 906. At block 908, the block free unit determines whether one or more conditions for tight mode are present. For example, the block free unit might determine whether the aggregate size of the block logs has reached a particular threshold or whether one or more individual block logs have reached a particular threshold. The block free unit can also check to see if a status variable indicates that one or more conditions for tight mode are present. For example, the block free unit might periodically analyze the size of the block logs. If the block free unit determines that the size of the block logs are greater than the particular threshold, the block free unit might set a variable to indicate that the block free unit is in tight mode. If the block free unit determines that the size of the block logs are not greater than the particular threshold, the block free unit might set the variable to indicate that the block free unit is not in tight mode. Thus, to determine whether the one or more conditions for tight mode are present, the block free unit might determine whether the variable is set to indicate that the block free unit is in tight mode. If the block free unit determines that one or more conditions for tight mode are present, control then flows to block 910. If the block free unit determines that one or more conditions for tight mode are not present, the process ends.

At block 910, the block free unit determines whether the sorted log is being generated. To determine whether the sorted log is being generated, the block free unit can determine whether the block free unit (or component therein) is in a state that corresponds to the generation of the sorted log (such as the "MERGE" state described above). If the block free unit determines that the sorted log is being generated, control then flows to block 912. If the block free unit determines that the sorted log is not being generated, control then flows to block 914.

At block 912, the block free unit indicates that at least one block identifier should be merged into the sorted log. Typically, the block free unit maintains a count of the number of block identifiers that should be merged into the sorted log. Thus, to indicate that at least one block identifier should be merged into the sorted log, the block free unit can increment the count of the number of block identifiers that should be merged into the sorted log. The block free unit might also indicate that more than one block identifier should be merged into the sorted log. For example, the block free unit might increment the count of the number of block identifiers that should be merged by two. After the block free unit indicates that at least one block identifier should be merged into the sorted log, the process ends.

Control flowed to block 914 if it was determined, at block 910, that the sorted log is not being generated. At block 914, the block free unit determines whether the block identifiers in the sorted log are being processed. To determine whether the block identifiers in the sorted log are being processed, the block free unit can determine whether the block free unit (or component therein) is in a state that corresponds to the block identifiers in the sorted log being processed (such as the "FREE" state described above). If the block free unit determines that the block identifiers in the sorted log are being processed, control then flows to block 916. If the block free unit determines that the block identifiers in the sorted log are not being processed, the process ends.

At block 916, the block free unit indicates that at least one block identifier in the sorted log should be processed. Typically, the block free unit maintains a count of the number of block identifiers in the sorted log that should be processed. Thus, to indicate that at least one block identifier in the sorted log should be processed, the block free unit can increment the count of the number of block identifiers in the sorted log that should be processed. The block free unit might also indicate that more than one block identifier in the sorted log should be processed. For example, the block free unit might increment the count of the number of block identifiers in the sorted log that should be processed by two. After the block free unit indicates that at least one block identifier in the sorted log should be processed, the process ends.

The example operations depicted in FIG. 9 are described as occurring in response to receiving, at block 900, a single notification that a block is to be freed. However, as described in relation to FIG. 8, the operations can be performed responsive to receiving multiple notifications. In other words, the operations depicted at blocks 902 through 916 might only be performed after receiving a specific number of notifications or after periodic time intervals instead of being performed after each notification is received.

Further, it is assumed that when one unit of frontend work is received the resources for at least one unit of backend work are reserved. For example, for each received notification that a block is to be freed, at least one block identifier is processed from the sorted log (if the sorted log has been generated). However, a block free unit can be configured to reserve less than one full unit of backend work per unit of frontend work. For example, when not in tight mode, the block free unit might reserve one unit of backend work for every two units of frontend work received.

It should be noted that the descriptions above refer to "indications" that blocks are to be freed as well as "notifications" that blocks are to be freed. In practice, an indication that a block is to be freed and a notification that a block is to be freed can be the same thing. The descriptions herein, however, use the term "indication" when describing a communication or message that includes an identification of a block. The term "notification" is used when describing a communication or message that optionally includes an identification of a block. However, in practice, an "indication" can serve as a "notification" and vice versa. Consider, for example, the operations described in relation to FIG. 8. As described above, at stage B of FIG. 8 the workload management unit 804 receives "notifications" that blocks are to be freed. The subsequent operations performed by the workload management unit 804 can be performed without specific block identifiers. However, the workload management unit 804 can perform the same operations even if the notifications received identified specific blocks. In general, the terms "indication", "notification", "communication", "message", etc. describe similar concepts and should not be construed to refer to distinct concepts unless otherwise indicated.

The examples herein assume that a block log is a list of block identifiers. As such, appending a block identifier to a block log is functionally equivalent to inserting the block identifier at the end of the block log. However, in storage systems that implement the block log using a different format or data structure, the operation of inserting the block identifier into the block log may vary accordingly. For example, if the block log is implemented as a tree, the operations performed to insert a block identifier into the block log can comprise operations corresponding to inserting a node in a tree.

As example flowcharts, FIGS. 4, 5, 6, and 9 present operations in an example order from which storage systems can deviate (e.g., operations can be performed in a different order than illustrated and/or in parallel; additional or fewer operations can be performed, etc.). For example, FIG. 9 depicts the operations at blocks 912 and 916 as being mutually exclusive. However, in a storage system in which block identifiers can be merged into a sorted log while block identifiers in the sorted log are being processed, the operations performed at blocks 912 and 916 might not be mutually exclusive.

As will be appreciated by one skilled in the art, aspects of the disclosures herein may be embodied as a system, method or computer program product. Accordingly, aspects of the disclosures herein may take the form of an entirely hardware implementation, an entirely software implementation (including firmware, resident software, micro-code, etc.) or an implementation combining software and hardware aspects that may all generally be referred to herein as a "circuit," "module" or "system." Furthermore, aspects of the disclosures herein may take the form of a program product embodied in one or more machine readable medium(s) having machine readable program code embodied thereon.

Any combination of one or more machine readable medium(s) may be utilized. The machine readable medium may be a machine readable signal medium or a machine readable storage medium. A machine readable storage medium may be, for example, a system, apparatus, or device that uses electronic, magnetic, optical, electromagnetic, infrared, or semiconductor technology, or a combination thereof. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium does not include transitory, propagating signals.

A machine readable signal medium may include a propagated data signal with machine readable program code embodied therein, for example, in baseband or as part of a carrier wave. Such a propagated signal may take any of a variety of forms, including, but not limited to, electro-magnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Program code for carrying out operations for aspects of the disclosures herein may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine. Examples of a machine that would execute/interpret/translate program code include a computer, a tablet, a smartphone, a wearable computer, a robot, a biological computing device, etc.

Figure 10:
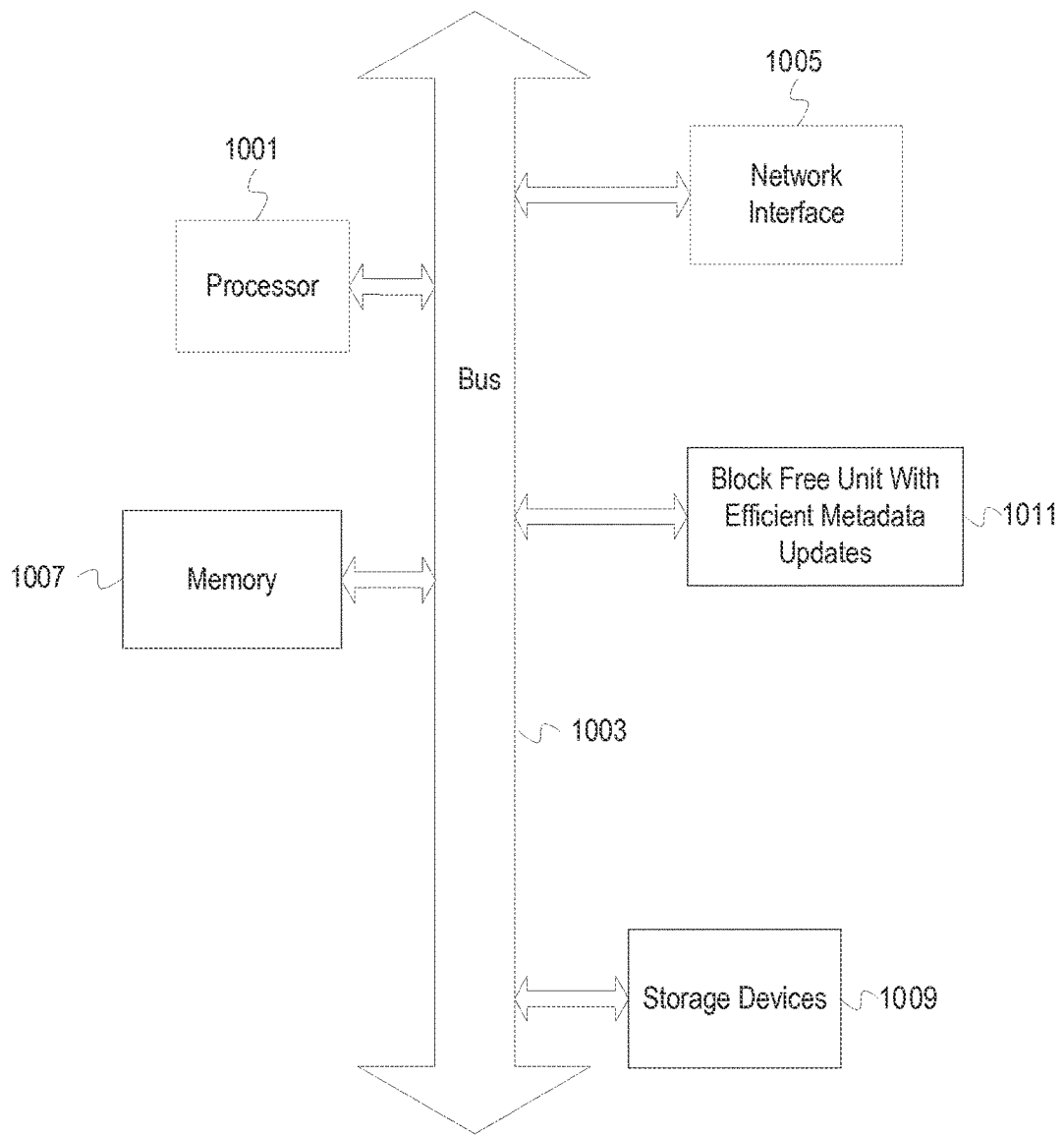
FIG. 10 depicts an example computer system with a block free unit.

FIG. 10 depicts an example computer system with a block free unit. A computer system includes a processor 1001 (possibly including multiple processors, multiple cores, multiple nodes, and/or implementing multi-threading, etc.). The computer system includes memory 1007. The memory 1007 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 1003 (e.g., PCI, ISA, PCI-Express, Hyper-Transport®, InfiniBand®, NuBus, etc.), a network interface 1005 (e.g., an ATM interface, an Ethernet interface, a Frame Relay interface, SONET interface, wireless interface, etc.), and a storage device(s) 1009 (e.g., optical storage, magnetic storage, etc.). The block free unit 1011 embodies functionality to implement features described above. The block free unit 1011 may perform operations that facilitate increasing the efficiency of metadata updates related to freeing blocks of data. The block free unit 1011 may perform operations that facilitate logging indications of blocks that should be free, sorting the indications to increase spatial locality of the indications, and updating metadata associated with the blocks. Any one of these functionalities may be partially (or entirely) implemented in hardware and/or on the processor 1001. For example, the functionality may be implemented with an application specific integrated circuit, in logic implemented in the processor 1001, in a co-processor on a peripheral device or card, etc. Further, realizations may include fewer or additional components not illustrated in FIG. 10 (e.g., video cards, audio cards, additional network interfaces, peripheral devices, etc.). The processor 1001, the storage device(s) 1009, and the network interface 1005 are coupled to the bus 1003. Although illustrated as being coupled to the bus 1003, the memory 1007 may be coupled to the processor 1001.

While the examples are described with reference to various implementations and exploitations, it will be understood that these examples are illustrative and that the scope of the disclosures herein is not limited to them. In general, techniques for freeing blocks of data as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosures herein. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosures herein.

Use of the phrase "at least one of . . . or" should not be construed to be exclusive. For instance, the phrase "X comprises at least one of A, B, or C" does not mean that X comprises only one of {A, B, C}; it does not mean that X comprises only one instance of each of {A, B, C}, even if any one of {A, B, C} is a category or sub-category; and it does not mean that an additional element cannot be added to the non-exclusive set (i.e., X can comprise {A, B, Z}).

What is claimed is:

1. A method, comprising:
   updating by a processor, a first subset of a first log identified as an active log by a pointer, with a received first block identifier of a data block, the first log comprises a plurality of subsets each subset including block identifiers identifying data blocks as candidates for re-allocation for storing data, wherein the data blocks are physical or logical;

sorting by the processor, a plurality of block identifiers of the first subset that has reached a threshold, wherein the first subset remains in a same position within the first log after being sorted while block identifiers of the first subset are re-arranged within the first subset;

generating by the processor, a second log comprising the plurality of subsets of the first log, after the first log is identified by the processor as an inactive log using the pointer;

selecting by the processor a second block identifier from the second log;

updating by the processor metadata associated with the second block identifier indicating whether a data block associated with the second block identifier is free to be allocated or is not free to be allocated;

wherein the processor allocates the data block associated with the second block identifier when the updating indicates that the data block associated with the second block identifier is free to be allocated.

2. The method of claim 1, wherein said sorting the plurality of block identifiers of the first subset is in response to determining that the first subset is full.

3. The method of claim 1 further comprising:
determining that a size of the first log has reached the threshold;
indicating that the first log is inactive in response to said determining that the size of the first log has reached the threshold; and
determining that the first subset is unsorted;
wherein said sorting the plurality of block identifiers of the first subset is in response to said determining that the first subset is unsorted.

4. The method of claim 3, wherein said indicating that the first log is inactive comprises indicating that a third log is active.

5. The method of claim 1,
wherein said generating the second log comprises:
adding a number of nodes to a binary heap, wherein each node is associated with a subset and comprises a block identifier from the subset, wherein a number of nodes is equal to a number of subsets;
removing each block identifier from an associated subset;
removing a root node from the binary heap;
adding a block identifier that comprises the root node to the second log;
removing the block identifier that comprises the root node from a subset associated with the root node; and
adding a second node to the binary heap, wherein the second node comprises another block identifier from the subset associated with the root node.

6. The method of claim 1, wherein said updating metadata associated with the second block identifier comprises:
reading the metadata associated with the second block identifier; and
decrementing a reference count associated with the data block identified by the second block identifier.

7. The method of claim 1, wherein said updating metadata associated with the second block identifier comprises:
reading the metadata associated with the second block identifier; and
indicating that the data block identified by the second block identifier is available to be allocated.

8. A computer program product for using metadata associated with a plurality of data blocks of storage device for allocating storage space for storing data, the computer program product comprising:

a non-transitory machine readable medium having program code embodied therewith, the program code to,
update by a processor, a first subset of a first log identified as an active log by a pointer, with a received first block identifier of a data block, the first log comprises a plurality of subsets each subset including block identifiers identifying data blocks as candidates for re-allocation for storing data, wherein the data blocks are physical or logical;

sort by the processor, a plurality of block identifiers of the first subset that has reached a threshold, wherein the first subset remains in a same position within the first log after being sorted while block identifiers of the first subset are re-arranged within the first subset;

generate by the processor, a second log comprising the plurality of subsets of the first log, after the first log is identified by the processor as an inactive log using the pointer;

select by the processor a second block identifier from the second log;

update by the processor metadata associated with the second block identifier indicating whether a data block associated with the second block identifier is free to be allocated or is not free to be allocated;

wherein the processor allocates the data block associated with the second block identifier when the updating indicates that the data block associated with the second block identifier is free to be allocated.

9. The computer program product of claim 8,
wherein the program code to sort the plurality of block identifiers of the first subset comprises program code to sort the plurality of block identifiers of the first subset in response to a determination that the first subset is full.

10. The computer program product of claim 8, further comprising program code to:
determine that a size of the first log has reached the threshold;
in response to a determination that the size of the first log has reached the threshold, indicate that the first log is inactive; and
determine that the first subset is unsorted;
wherein the program code to sort the plurality of block identifiers of the first subset comprises program code to sort the plurality of block identifiers of the first subset in response to said determining that the first subset is unsorted.

11. The computer program product of claim 8,
wherein said program code to generate the second log comprises program code to:
add a number of nodes to a binary heap, wherein each node is associated with a subset and comprises a block identifier from the subset, wherein a number of nodes is equal to a number of subsets;
remove each block identifier from an associated subset;
remove a root node from the binary heap;
add a block identifier that comprises the root node to the second log;
remove the block identifier that comprises the root node from a subset associated with the root node; and
add a second node to the binary heap, wherein the second node comprises another block identifier from the subset associated with the root node.

12. The computer program product of claim 8, wherein said program code to update metadata associated with the second block identifier comprises program code to:

read the metadata associated with the second block identifier; and decrement a count of references associated with the data block identified by the second block identifier.

13. The computer program product of claim 8, wherein said program code to update metadata associated with the second block identifier comprises program code to:

read the metadata associated with the second block identifier; and indicate that the data block identified by the second block identifier is available to be allocated.

14. A device comprising:

a processor; and a machine readable storage medium having program code stored therein that is executable by the processor to cause the device to:

sort a first plurality of block identifiers in a first subset of a first log based, at least in part, on a measure of spatial locality; wherein the block identifiers are indications of data blocks stored within a storage device;

upon a second subset of the first log reaching a predefined threshold, sort a second plurality of block identifiers in the second subset, at least in part, on the measure of spatial locality, wherein the first subset and the second subset remain in the same position within the first log after being sorted;

incrementally merge at least the first and the second plurality of block identifiers into a third plurality of block identifiers in a subset of a second log based, at least in part, on the measure of spatial locality; wherein the second log is generated based on an indication from a pointer that the first log is inactive, update metadata associated with a plurality of block identifiers of the third plurality of block identifiers; and using the updated metadata to identify a data block of the storage device that is free for allocation to store data and allocate the identified data block for storing data.

15. The device of claim 14, wherein the program code further comprises program code executable by the processor to cause the device to:

determine that a size of the first plurality of block identifiers has reached a first threshold; and determine that a size of at least the first plurality of block identifiers and the second plurality of block identifiers has reached a second threshold;

wherein the first plurality of block identifiers are sorted in response to the determination that the size of the first plurality of block identifiers has reached the first threshold, wherein the first plurality of block identifiers and the second plurality of block identifiers are merged into the third plurality of block identifiers in response to a determination that the size of at least the first plurality of block identifiers and the second plurality of block identifiers has reached the second threshold.

16. The device of claim 14, wherein the measure of spatial locality is a difference between the first plurality of block identifiers.

17. The device of claim 14, wherein the program code further comprises program code executable by the processor to cause the device to add a block identifier to the first plurality of block identifiers.

18. The device of claim 14, wherein the program code being executable by the processor to cause the device to update the metadata comprises program code executable by the processor to cause the device to:

read the metadata from a storage device; and modify the metadata to indicate that at least one of a block associated with a block identifier of the third plurality of block identifiers is available to be allocated.

19. The device of claim 14, wherein the program code being executable by the processor to cause the device to incrementally merge at least the first plurality of block identifiers and the second plurality of block identifiers into the third plurality of block identifiers comprises program code executable by the processor to cause the device to:

select a first block identifier from the first plurality of block identifiers, wherein the first block identifier is an initial block identifier of the first plurality of block identifiers based on the measure of spatial locality;

select a first block identifier from the second plurality of block identifiers, wherein the second block identifier is an initial block identifier of the second plurality of block identifiers based on the measure of spatial locality; and initialize a min-heap with a plurality of nodes, wherein the plurality of nodes comprise the first block identifier selected from the first plurality of block identifiers and the first block identifier selected from the second plurality of block identifiers.

20. The device of claim 19, wherein the program code being executable by the processor to cause the device to update the metadata comprises program code executable by the processor to cause the device to:

read the metadata from a storage device; and modify the metadata to indicate that a reference count associated with a block associated with a block identifier of the third plurality of block identifiers has decreased.

\* \* \* \* \*